US012787072B2

(12) United States Patent
Kim et al.

(10) Patent No.: US 12,787,072 B2
(45) Date of Patent: Nov. 3, 2026

(54) THROUGH MULTI-LINK IN WIRELESS COMMUNICATION SYSTEM, AND WIRELESS COMMUNICATION TERMINAL

(71) Applicant: WILUS INSTITUTE OF STANDARDS AND TECHNOLOGY INC., Gyeonggi-do (KR)

(72) Inventors: Sanghyun Kim, Seoul (KR); Hanseul Hong, Seoul (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 601 days.

(21) Appl. No.: 18/202,866

(22) Filed: May 26, 2023

(65) Prior Publication Data

US 2023/0300903 A1 Sep. 21, 2023

Related U.S. Application Data

(63) Continuation of application No. PCT/KR2021/017801, filed on Nov. 29, 2021.

(30) Foreign Application Priority Data

Nov. 27, 2020 (KR) ........................ 10-2020-0163393
Dec. 3, 2020 (KR) ........................ 10-2020-0167924
(Continued)

(51) Int. Cl.
*H04W 74/0833* (2024.01)
*H04W 74/08* (2024.01)

(52) U.S. Cl.
CPC ..... *H04W 74/085* (2013.01); *H04W 74/0866* (2013.01)

(58) Field of Classification Search
CPC ............. H04W 12/08; H04W 74/0816; H04W 74/085; H04W 74/0866; H04W 76/15;
(Continued)

(56) References Cited

U.S. PATENT DOCUMENTS

2018/0254993 A1* 9/2018 Ahn .................... H04W 74/002
2018/0317242 A1 11/2018 Park et al.
(Continued)

FOREIGN PATENT DOCUMENTS

CN 101828416 A 9/2010
CN 109314997 A 2/2019
(Continued)

OTHER PUBLICATIONS

Seok, Yongho et al., "UL Sync Channel Access Procedure", IEEE 802.1 1-20/1730r2, Nov. 2, 2020.*
(Continued)

*Primary Examiner* — Ayman A Abaza
*Assistant Examiner* — Hooman Houshmand
(74) *Attorney, Agent, or Firm* — EIP US LLP

(57) ABSTRACT

Disclosed is a method for transmitting and receiving data in a non-access point (AP) multi-link device (MILD) of a wireless communication system. The non-AP MLD may perform a back off procedure for performing simultaneous transmission through a multi-link of the non-AP MLD, and simultaneously perform uplink transmission to an AP MLD through each of a first link and a second link included in the multi-link. Here, when both a first back-off counter and a second back-off counter have a value of "0", if the transmission time of the uplink transmission in the first link is a slot boundary of a first slot that is a slot next to a slot in
(Continued)

which the first back-off counter is "0", the uplink transmission in the second link may be performed within a predetermined time from the transmission time of the first link.

14 Claims, 40 Drawing Sheets

(30) Foreign Application Priority Data

Dec. 4, 2020 (KR) ........................ 10-2020-0169017
Feb. 4, 2021 (KR) ........................ 10-2021-0015799

(58) Field of Classification Search
CPC ...... H04W 84/12; H04L 69/14; H04L 69/321; H04L 69/323; H04L 69/324
See application file for complete search history.

(56) References Cited

U.S. PATENT DOCUMENTS

| | | | | |
|---|---|---|---|---|
| 2019/0037584 | A1 | 1/2019 | Park et al. | |
| 2019/0253963 | A1* | 8/2019 | Kim | H04W 84/12 |
| 2020/0137626 | A1 | 4/2020 | Huang et al. | |
| 2020/0163116 | A1 | 5/2020 | He et al. | |
| 2021/0076398 | A1* | 3/2021 | Naribole | H04W 74/0816 |
| 2021/0251006 | A1* | 8/2021 | Cariou | H04W 74/0816 |
| 2021/0315025 | A1* | 10/2021 | Seok | H04W 74/0808 |
| 2021/0321450 | A1* | 10/2021 | Cariou | H04W 74/002 |
| 2022/0150958 | A1* | 5/2022 | Chu | H04W 74/0866 |
| 2022/0338253 | A1* | 10/2022 | Lu | H04W 74/085 |
| 2023/0040910 | A1* | 2/2023 | Hwang | H04W 74/0808 |
| 2023/0074050 | A1* | 3/2023 | Wu | H04W 8/22 |
| 2024/0349377 | A1* | 10/2024 | Ambede | H04W 28/0967 |

FOREIGN PATENT DOCUMENTS

| | | |
|---|---|---|
| CN | 111641970 | 9/2020 |
| KR | 10-2020-0091968 | 8/2020 |
| WO | 2020/226462 | 11/2020 |
| WO | 2022/114907 | 6/2022 |

OTHER PUBLICATIONS

Seok, Yongho et al., "Error Recovery in Synchronous Multiple Frame Transmission", IEEE 802.1 1-20/1278r0, Oct. 20, 2020.*

Extended European Search Report dated Sep. 30, 2024 for European Patent Application No. 21898732.9.

Yongho Seok, MediaTek: "Synchronous Multi-link Transmission of Non-STR MLD", doc.: IEEE 802.11-20/1053r0, Jul. 28, 2020, slides 1-14.

Yongho Seok, MediaTek: "RTS and CTS Procedure in Synchronous Multi-link Operation", doc.: IEEE 802.11-20/0577r0, Apr. 13, 2020, slides 1-20.

Office Action (1st) dated Jun. 24, 2025 for European Patent Application No. 21 898 732.9.

Office Action (1st) dated Aug. 8, 2025 for Vietnamese Patent Application No. 1-2023-04217 and its English translation provided by Applicant's foreign counsel.

Office Action dated Mar. 4, 2024 for Japanese Patent Application No. 2023-532609 and its English translation provided by Applicant's foreign counsel.

Yongho Seok, et al., Synchronous Multi-link Transmission of Non-STR Mld, IEEE 802.11-20/1053r1, IEEE, internet <URL:https://mentor.ieee.org/802.11/dcn/20/11-20-1053-01-00be-synchronous-multi-link-transmission-of-non-str-mld.pptx>, Aug. 5, 2020.

Dmitry Akhmetov, et al., Discussion on methods for synchronous ML operations, IEEE 802. 11-20/0993r7, IEEE, internet <URL:https://mentor.ieee.org/802.11/dcn/20/11-20-0993-07-00be-sync-ml-operations-of-non-str-device.pptx>, Sep. 8, 2020.

Office Action dated Mar. 8, 2024 for Indian Patent Application No. 202327037038.

International Search Report for PCT/KR2021/017801 mailed on Mar. 15, 2022 and its English translation from WIPO (now published as WO 2022/114907).

Written Opinion of the International Searching Authority for PCT/KR2021/017801 mailed on Mar. 11, 2022 and its English translation by Google Translate (now published as WO 2022/114907).

Seok, Yongho et al., "UL Sync Channel Access Procedure", IEEE 802.11-20/1730r2, Nov. 2, 2020, slides 3-5.

Ho, Duncan et al., "Sync PPDUs", IEEE 802.11-20/0026r7, Jun. 29, 2020, slides 5-9.

Seok, Yongho et al., "Error Recovery in Synchronous Multiple Frame Transmission", IEEE 802.11-20/1278r0, Oct. 20, 2020, slide 8.

Seok, Yongho et al., "UL Sync Channel Access Procedure", IEEE 802.11-20/1730r0, Oct. 29, 2020.

Seok, Yongho et al., "UL Sync Channel Access Procedure", IEEE 802.11-20/1730r1, Oct. 29, 2020.

Korean Office Action issued in Application No. 10-2023-7018124, dated Dec. 17, 2025, 6 pgs.

Chinese First Office Action in CN Appln. No 202180079943.6, dated Mar. 26, 2026, 22 pages with English Translation.

Seok et al., UL Sync Channel Access Procedure, IEEE 802.11-20/1730r3, Nov. 3, 2020, 10 pages.

Zhang et al., "Collision-Sequential Resolution Algorithm", Chinese Journal of Computers, IEEE 802.11 Wireless Networks, May 2009, 11 pages.

Indian Hearing Notice in IN Appln. No. 202327037038, dated Jul. 24, 2026, 3 pages.

Chinese Office Action in CN Appln. No. 202180079943.6, dated Aug. 7, 2026, 15 pages with English Translation.

* cited by examiner

THROUGH MULTI-LINK IN WIRELESS COMMUNICATION SYSTEM, AND WIRELESS COMMUNICATION TERMINAL

CROSS-REFERENCE TO RELATED APPLICATIONS

This application is a continuation of International Patent Application No. PCT/KR2021/017801 filed on Nov. 29, 2021, which claims the priority to Korean Patent Application No. 10-2020-0163393 filed in the Korean Intellectual Property Office on Nov. 27, 2020, Korean Patent Application No. 10-2020-0167924 filed in the Korean Intellectual Property Office on Dec. 3, 2020, Korean Patent Application No. 10-2020-0169017 filed in the Korean Intellectual Property Office on Dec. 4, 2020, and Korean Patent Application No. 10-2021-0015799 filed in the Korean Intellectual Property Office on Feb. 4, 2021, the entire contents of which are incorporated herein by reference.

TECHNICAL FIELD

The present invention relates to a wireless communication system and, more specifically, to a method of transmitting or receiving data by a multi-link device (MILD) in a wireless communication system, and a wireless communication terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11 ad has been provided. The IEEE 802.11 ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.1 lac and 802.1 lad, the IEEE 802.1 lax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An aspect of an embodiment of the present invention is to provide a wireless communication method using multiple links and a wireless communication terminal using same.

In addition, an aspect of the present invention is to provide a wireless communication terminal for simultaneously performing uplink transmission by a multi-link device by using multiple links.

In addition, an aspect of the present invention is to provide a wireless communication terminal for simultaneously performing uplink transmission in multiple links in a case where backoff counter values of the respective links reach "0" at different time points when uplink transmission is performed using the multiple links.

In addition, an aspect of the present invention is to provide a wireless communication terminal for simultaneously performing uplink transmission in multiple links by delaying an uplink transmission time point in a case where slot boundaries of the respective links are different from each other when uplink transmission is simultaneously performed using the multiple links.

The technical tasks to be achieved by the present specification is not limited to those mentioned above, and other technical tasks that are not mentioned above may be clearly understood to a person having common knowledge in the technical field to which the present disclosure belongs based on the description provided below.

Solution to Problem

A terminal for transmitting a trigger based physical layer protocol data unit (TB PPDU) that is a response frame, based on a trigger frame in a wireless communication system includes: a communication module; and a processor configured to control the communication module, wherein the processor is configured to: perform a backoff procedure to perform uplink transmission through multiple links of the non-AP MLD, the backoff procedure being individually performed through each of a first link of a first STA included in the non-AP MLD and a second link of a second STA included therein, the backoff procedure in the first link being performed using a first backoff counter, the backoff procedure in the second link being performed using a second backoff counter; and simultaneously perform the uplink transmission to an AP MLD through each of the first link and the second link, and, in a case where the first backoff counter and the second backoff counter have both a value of "0", when a transmission time point of the uplink transmission in the first link is a slot boundary of a first slot that is next to a slot in which the first backoff counter is "0", the uplink transmission in the second link is performed within a predetermined time from the transmission time point of the first link.

In addition, in the present invention, in a case where the first backoff counter and the second backoff counter are both "0", a transmission time point of the uplink transmission in the second link is adjusted to be included in the predetermined time from the slot boundary of the first slot.

In addition, in the present invention, in a case where the first backoff counter is "0" and the second backoff counter is "0", the slot boundary of the first slot does not match a slot boundary of a second slot that is next to a slot in which the second backoff counter of the second link is "0", and the slot boundary of the second slot is not included in the predetermined time.

In addition, in the present invention, in a case where one backoff counter among the first backoff counter and the second backoff counter has reached "0" earlier than a remaining backoff counter, a link using the one backoff counter among the first link and the second link does not perform the uplink transmission, and maintains the one backoff counter at "0" until the remaining backoff counter reaches "0".

In addition, in the present invention, in a case where one backoff counter among the first backoff counter and the second backoff counter has reached "0" earlier than a remaining backoff counter, if the slot boundary of the first slot of the first link does not match a slot boundary of a second slot that is next to a slot in which the second backoff counter of the second link is "0" when the remaining backoff counter reaches "0", a transmission time point of the uplink transmission in the second link is adjusted to be positioned before or after the slot boundary of the second slot so as to be included in the predetermined time from the slot boundary of the first slot.

In addition, in the present invention, in a case where the slot boundary of the second slot is positioned before or after the slot boundary of the first slot in a time axis, the transmission time point of the second link is delayed or advanced from the slot boundary of the first slot by a particular time.

In addition, in the present invention, a maximum value of the predetermined time is 4 μs.

In addition, in the present invention, the 4 μs is a change time required to perform the uplink transmission from a channel access procedure.

In addition, in the present invention, the processor is configured to perform channel sensing up to the transmission time point of the second link, and the transmission time point of the second link does not match the slot boundary of the second slot of the second link.

In addition, in the present invention, the uplink transmission is performed in slots next to slots in which the first backoff counter and the second backoff counter have reached "0".

In addition, in the present invention, the first link and the second link are an NSTR link pair that does not support simultaneous transmit or receive (STR).

In addition, in the present invention, the processor is configured to perform sensing to determine whether a channel is idle in each of the first link and the second link, and the first backoff counter and the second backoff counter are decreased when the first link and the second link are in an idle state, respectively.

In addition, the present invention provides a method including: performing a backoff procedure to perform uplink transmission through multiple links of the non-AP MLD, the backoff procedure being individually performed through each of a first link of a first STA included in the non-AP MLD and a second link of a second STA included therein, the backoff procedure in the first link being performed using a first backoff counter, the backoff procedure in the second link being performed using a second backoff counter; and simultaneously performing the uplink transmission to an AP MLD through each of the first link and the second link, wherein, in a case where the first backoff counter and the second backoff counter have both a value of "0", when a transmission time point of the uplink transmission in the first link is a slot boundary of a first slot that is next to a slot in which the first backoff counter is "0", the uplink transmission in the second link is performed within a predetermined time from the transmission time point of the first link.

Advantageous Effects of Invention

An embodiment of the present invention provides a wireless communication method efficiently using multiple links and a wireless communication terminal using same.

In addition, an embodiment of the present invention provides a wireless communication terminal which enables a multi-link device to simultaneously perform uplink transmission by using multiple links.

In addition, an embodiment of the present invention provides a wireless communication terminal which simultaneously performs uplink transmission in multiple links in a case where backoff counter values of the respective links reach "0" at different time points when uplink transmission is performed using the multiple links.

In addition, an embodiment of the present invention provides a wireless communication terminal which simultaneously performs uplink transmission in multiple links by delaying an uplink transmission time point in a case where slot boundaries of the respective links are different from each other when uplink transmission is simultaneously performed using the multiple links.

The effects obtainable in the present invention are not limited to the above-mentioned effects, and other effects that are not mentioned may be clearly understood by those skilled in the art to which the present invention belongs, from descriptions below.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively. Hereinafter, in the present invention, a field and a subfield may be interchangeably used.

Figure 1:
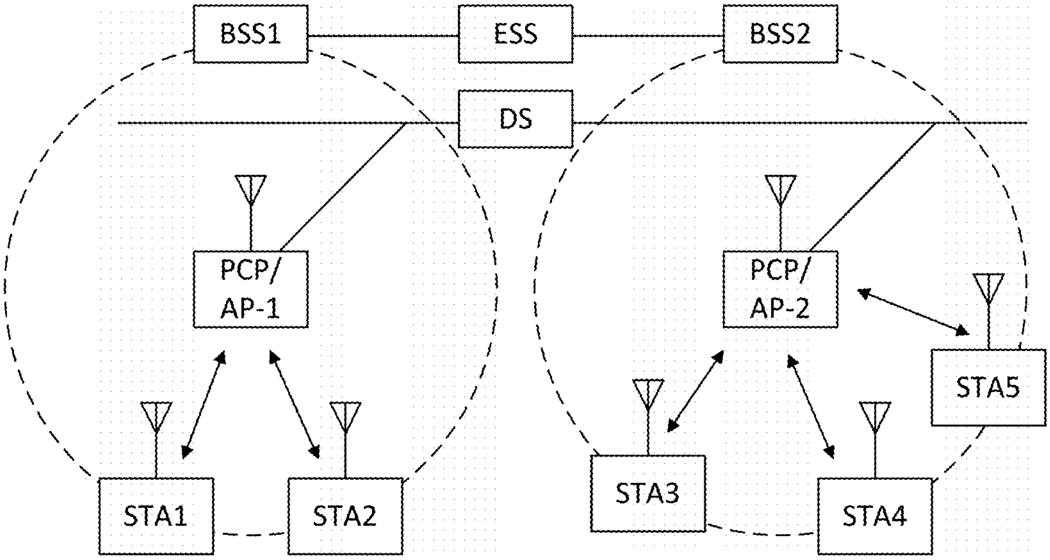
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
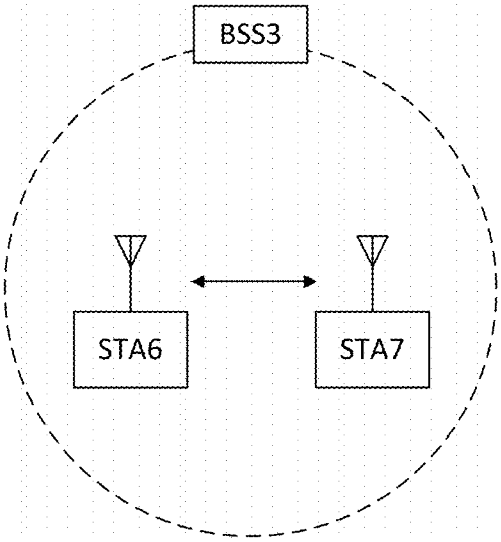
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
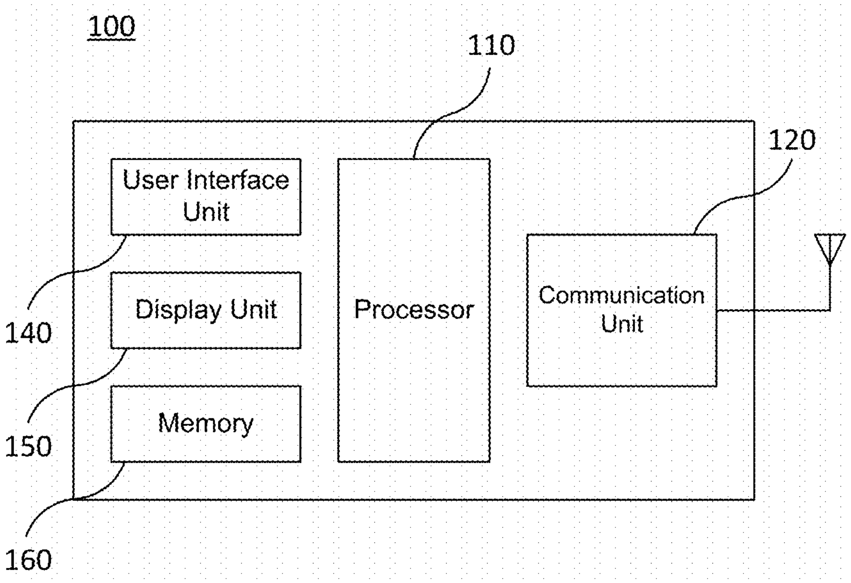
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
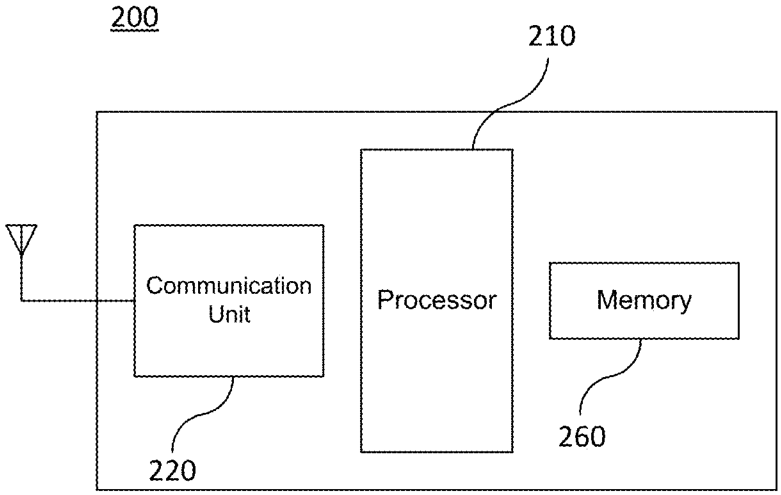
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
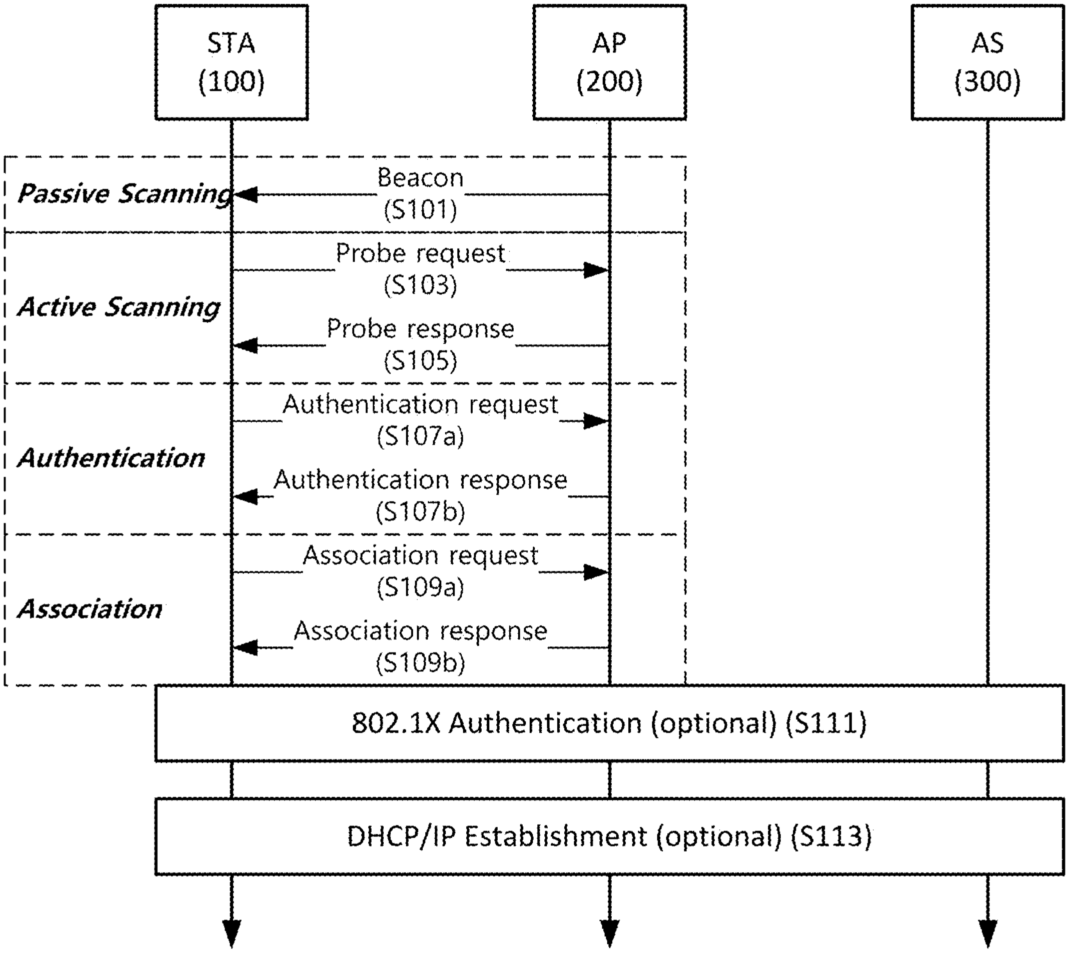
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
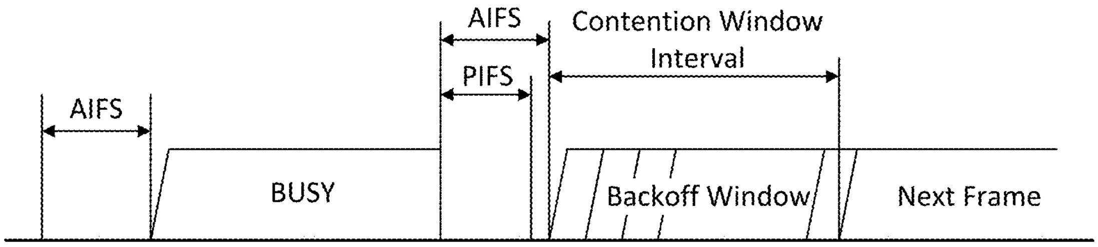
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIF S). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, a terminal of the present disclosure is referred to as a non-AP STA, an AP STA, an AP, a STA, a receiving device or a transmitting device, but the present disclosure is not limited thereto. In addition, the AP STA of the present disclosure may be referred to as the AP.

<Examples of Various PPDU Formats>

Figure 7:
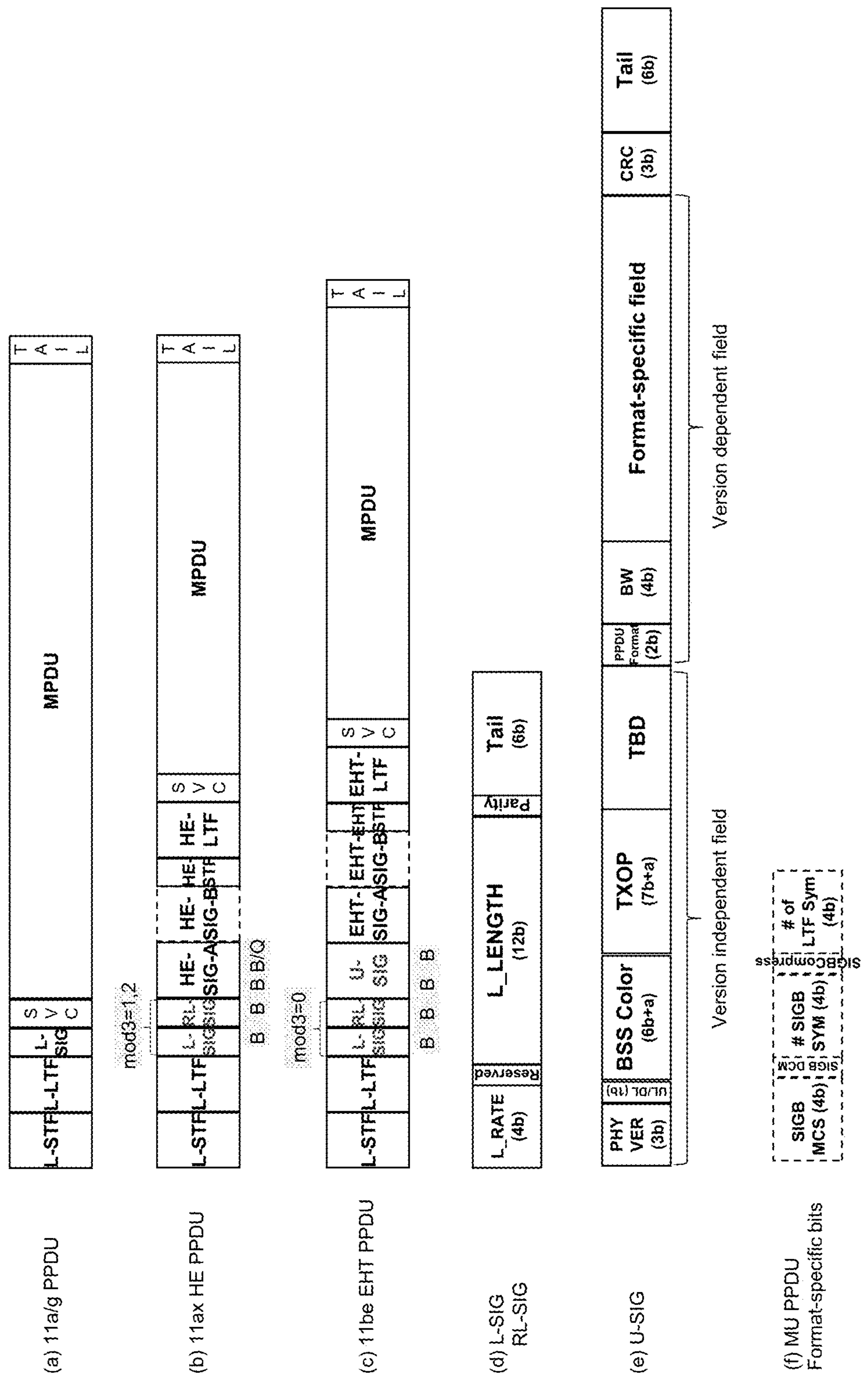
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(*d*) illustrates detailed field configurations of RL-SIG and L-SIG commonly used in the PPDU formats.

Referring to FIG. 7(*a*), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(*b*), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(*c*), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(*d*) illustrates a 24-bit information configuration of L-SIG.

Referring to FIG. 7(*d*), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RXTIME) is acquired, which is expressed by Equation 1 below.

$$RXTIME(us) = \left(\left\lceil \frac{\text{L\_LENGTH} + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$\text{L\_LENGTH(byte)} = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$\text{TXTIME (us)} = T_{L\text{-}STF} + T_{L\text{-}LTF} + T_{L\text{-}SIG} + T_{RL\text{-}SIG} + T_{U\text{-}SIG} + (T_{EHT\text{-}SIG\text{-}A}) + (T_{EHT\text{-}SIG\text{-}B}) + T_{EHT\text{-}STF} + N_{EHT\text{-}LTF} \cdot T_{EHT\text{-}LTF} + T_{DATA} \quad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(*e*), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11 be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11 be and subsequent generation wireless LAN standards into versions. 11 be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11 be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(*f*) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
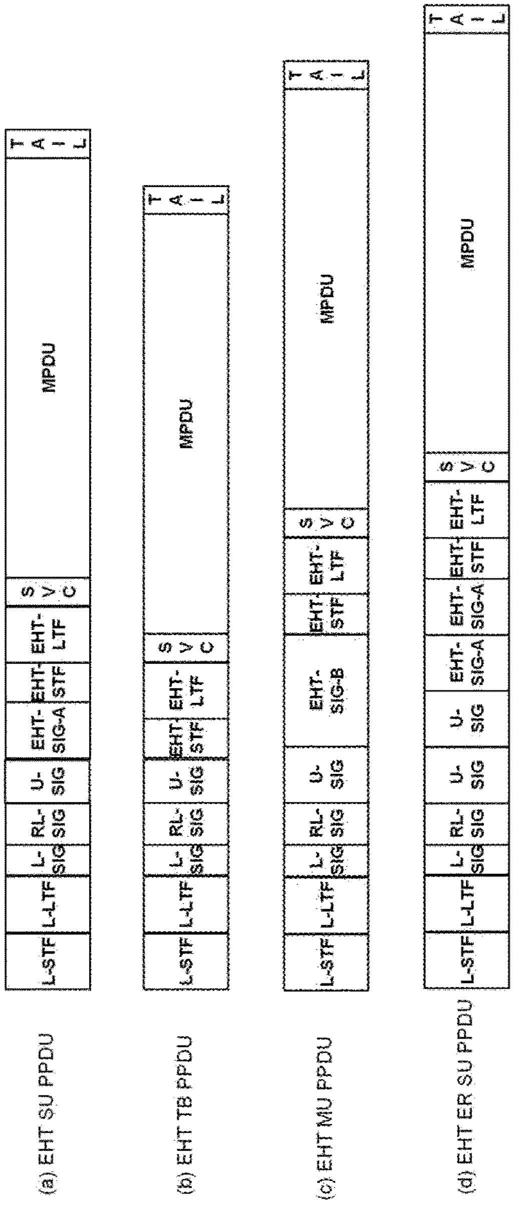
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(*a*) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(*b*) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, the EHT SU PPDU and the EHT MU PPDU may be indicated by the same value through the U-SIG PPDU format subfield. At this time, the EHT SU PPDU and the EHT MU PPDU may be divided by the number of the STAs receiving the PPDU. For example, the PPDU receiving one STA may be identified as the EHT SU PPDU, and when the number of the STAs is configured to receive two or more STAs, the PPDU may be identified as the EHT MU PPDU. In other words, two or more PPDU formats illustrated in FIG. 8 may be indicated through the same subfield value.

In addition, a part field among the fields illustrated in FIG. 8 or part information of the field may be omitted, and the case that the part field or the part information of the field is omitted may be defined as a compression mode or a compressed mode.

Figure 9:
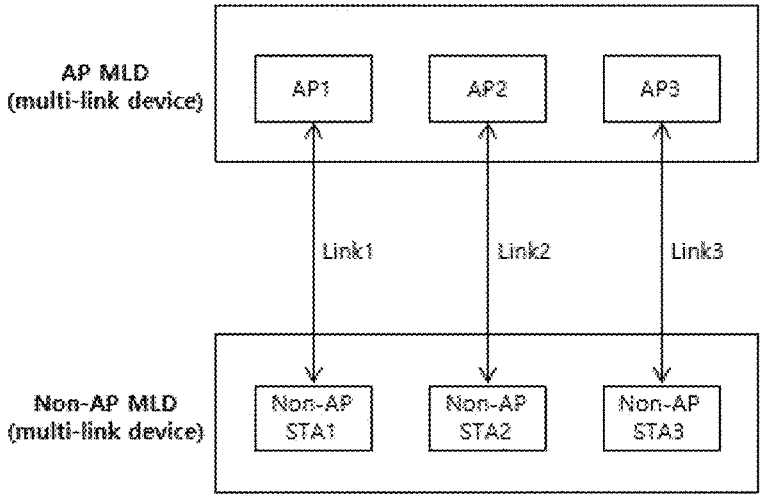
FIG. 9 illustrates an example of a multi-link device according to an embodiment of the present invention.

FIG. 9 is a diagram illustrating a multi-link device according to an embodiment of the present invention.

Referring to FIG. 9, a concept of a device with which one or more STAs are affiliated may be defined. As another embodiment, according to an embodiment of the present invention, devices with which STAs, the number of which exceeds one (i.e., two or more STAs), are affiliated may be defined. The device may be a logical concept. Therefore, this type of devices with which one or more STAs or two or more STAs are affiliated may be called multi-link devices (MLDs), multi-band devices, or multi-link logical entities (MLLEs).

Alternatively, the above type of devices may be named multi-link entities (MLEs). In addition, an MLD may have one medium access control service access point (MAC SAP) up to a logical link control (LLC), and the MLD may have one MAC data service.

STAs included in the MLD are able to operate in one or more links or channels. That is, the STAs included in the MLD are able to operate multiple different channels. For example, the STAs included in the MLD are able to operate using channels in different frequency bands of 2.4 GHz, 5 GHz, and 6 GHz. Therefore, it is possible for the MLD to obtain gain in channel access and increase the performance of the entire network. A conventional wireless LAN operates in a single link, but the MLD operation may use multiple links to obtain more channel access opportunities or enable STAs to efficiently operate in multiple links in consideration of channel situations.

In addition, if the STAs affiliated with the MLD are APs, the MLD with which the APs are affiliated may be an AP MLD. However, if the STAs affiliated with the MLD are non-AP STAs, the MLD with which non-APs are affiliated may be a non-AP MLD.

Referring to FIG. 9, there may be an MLD including multiple STAs, and the multiple STAs included in the MLD may operate in multiple links. In FIG. 9, an MLD including AP 1, AP 2, and AP 3 that are APs may be called an AP MILD, and an MLD including non-AP STA 1, non-AP STA 2, and non-AP STA 3 that are non-AP STAs may be named a non-AP MLD. The STAs included in the MLD may operate in link 1, link 2, link 3, or some links among link 1 to link 3.

According to an embodiment of the present invention, a multi-link operation may include a multi-link setup operation. The multi-link setup operation may be an operation corresponding to association performed in a single link operation. Multi-link setup may be required to be performed in order to exchange frames in multiple links. The multi-link setup operation may be performed using a multi-link setup element. Here, the multi-link setup element may include capability information related to multiple links, and the capability information may include information related to whether, while an STA included in the MLD receives a frame in a link, another STA included in the MLD is able to transmit a frame in another link. That is, the capability information may include information related to whether STAs (non-AP STAs and/or APs (or AP STAs)) are able to simultaneously transmit/receive frames in different transmission directions through links included in the MLD. In addition, the capability information may further include information related to an available link or operation channel.

The multi-link setup may be configured through negotiation between peer STAs, and a multi-link operation may be configured through one link.

According to an embodiment of the present invention, there may be a mapping relationship between a TID and a link of an MILD. For example, when a TID is mapped to a link, the TID may be transmitted through the mapped link. Mapping between a TID and a link may be performed based on a transmission direction (directional-based). For example, mapping may be performed in each of both directions between MLD1 and MLD2. In addition, there may be a default configuration for mapping between a TID and a link. For example, mapping between a TID and a link may basically indicate all TIDs mapped to a link.

Figure 10:
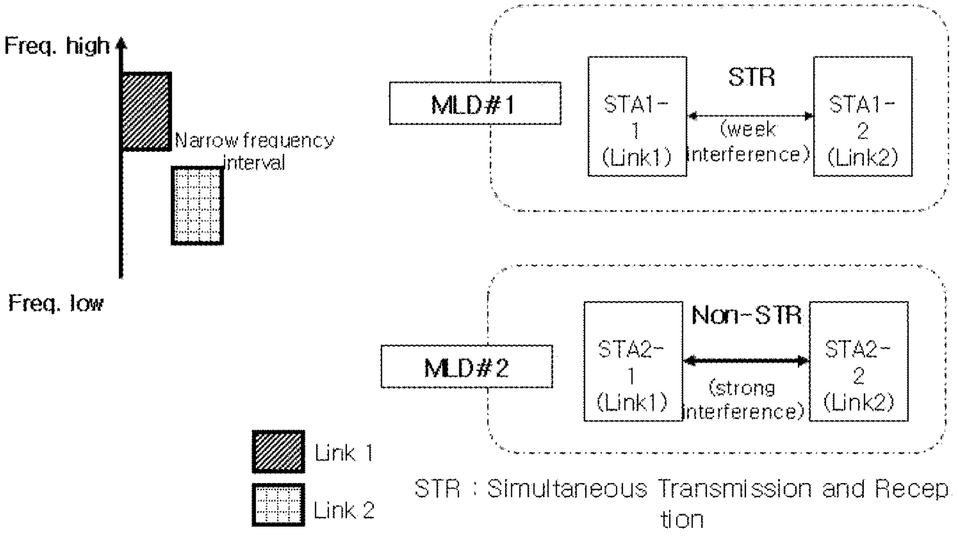
FIG. 10 illustrates an example of whether devices (MLD #1 and MLD #2) support STR for a relatively narrow frequency interval according to an embodiment of the present invention.

FIG. 10 illustrates an example of whether devices (MLD #1 and MLD #2) support STR for a relatively narrow frequency interval according to an embodiment of the present invention.

An embodiment of FIG. 10 shows a case where link 1 and link 2 are links using BWs positioned close to each other in the frequency domain. A frequency region used by link 1 is represented by a quadrangle filled with slashes, and a frequency region used by link 2 is represented by a quadrangle filled with grids. In the present embodiment, MLD #1 is an MLD having STA 1-1 and STA 1-2, and STA 1-1 and STA 1-2 operate in link 1 and link 2, respectively. In addition, MLD #2 is an MLD having STA 2-1 and STA 2-2, and STA 2-1 and STA 2-2 operate in link 1 and link 2, respectively. The links used by STA x-1 and STAx-2 belonging to each of MLD #1 and MLD #2 are link 1 and link 2 and thus are the same, but interference between the STAs of MLD #1 may be smaller than that between the STAs of MLD #2. Therefore, while STA 1-1 of MLD #1 performs transmission through link 1, STA 1-2 is able to succeed in decoding a packet received in link 2. However, when STA 2-1 of MLD #2 performs transmission through link 1, relatively strong interference occurs in link 2 and may interrupt decoding of STA 2-2. Therefore, STR availability between STAs existing in a single MLD may be different according to MLDs.

An AP MLD and an STA MLD may exchange information relating to whether STR is supported between APs in the AP MLD and whether STR is supported between STAs in the STA MLD, in order to determine an operation of the APs and the STAs using links. An STR support element may be used to indicate whether STR is supported in each link. The STR support element may be an element with a different name, exchanged between two MILDs to indicate whether STR is supported between devices in each MLD.

As an embodiment, the STR support element may indicate, with each bit, whether STR is supported between STAs or APs in an MILD. For example, when the STA MLD operates STA 1, STA 2, and STA 3, one bit may be configured as 1 to indicate STR being supported between STA 1 and STA 2. In addition, one bit may be configured as 0 to indicate STR not being supported between STA 2 and STA 3, and the other one bit may be configured as 1 to indicate STR being supported between STA 1 and STA 3. That is, the STR support element may use a total of three bits to signal, with 101, whether STR is supported between STA 1 and STA 2, between STA 2 and STA 3, and between STA 1 and STA 3. If link 1 used by STA 1 is 2.4 GHz, STA 1 is assumed to always support STR in a relationship with the other STAs in the STA MLD, and thus only STR availability between STA 2 and STA 3 may be signaled with one bit (or if the number of STAs existing in the STA MLD is 2, same may always be indicated with one bit).

As described above, whether STR is supported may be different according to a frequency interval between links, and thus when the AP MLD changes a center frequency of each link or changes an operation BW of each link, whether STR is supported between STAs of each STA MLD associated with the AP MLD may be changed. Therefore, when the AP MLD changes the operation BWs or center frequencies of some or all links, the STR support element may be exchanged if needed. The STR support element may be exchanged between an AP and an STA through requests and responses, or an STA may be required to automatically transmit same to an AP after change of a center frequency and/or an operation BW.

In addition, if STR support between internal STAs is impossible, the STA MILD may request an AP to change the center frequencies or operating bandwidths (BWs) of some or all links used by the STAs in which STR is not supported, or change a primary channel of 20 MHz (primary 20 channel). The link change request may be transmitted to the AP MLD through a link which the STA MLD requires to change, or may be transmitted from the AP MLD via another STA (of another link) in the same STA MILD. The link change request transmitted through another link may include information (link number, etc.) of a link to be changed. The meaning of link change used in the present embodiment may be interpreted as the meaning of operating channel change within 2.4 GHz, 5 GHz, or 6 GHz rather than frequency movement among 2.4 GHz, 5 GHz, and 6 GHz bands.

In addition, the link change request may include information relating to a method of changing the link. As an embodiment, the link change request may indicate to move the center frequency of a link to a higher frequency or a lower frequency. Alternatively, the link change request may implicitly indicate to change the center frequency of a link in a direction going away from an adjacent link. As another embodiment, the link change request may indicate to reduce the bandwidth of a link. As yet another embodiment, the link change request may indicate to change the primary channel position of a link to a lower frequency or a higher frequency.

An AP having received the link change request from the STA MLD may accept the request of an STA and change a link requested to be changed (center frequency, BW, or primary channel position) or may disregard the link change request of the STA and maintain a setting related to the link.

<Simultaneous Transmission Using Multiple Links>

As described above, whether STR is supported between STAs operated by a particular MLD may be different according to a relationship (interval, etc.) between links in which the respective STAs are operated. If STA 1 and STA 2 operated by a particular MLD are operated in link 1 and link 2 that are a link pair not supporting STR, respectively, respective operations of STA 1 and STA 2 may be restricted according to the state of an operation being performed by each other. More specifically, if STA 1 is performing PPDU transmission through link 1, STA 2 may not be able to normally decode a packet received in link 2 due to in-device interference incurred by the transmission being performed by STA 1 in link 1. As described above, when a reception operation of STAs (of the same MLD) operated in a particular link pair is interrupted by in-device interference, we may say that the STAs are in a non-STR relationship. An MLD including STAs being in a non-STR relationship may be considered as a non-STR MLD.

STAs being in a non-STR relationship may be interrupted by in-device interference during a channel access operation as well as a reception operation, and an example will be described with reference to FIG. 11.

Figure 11:
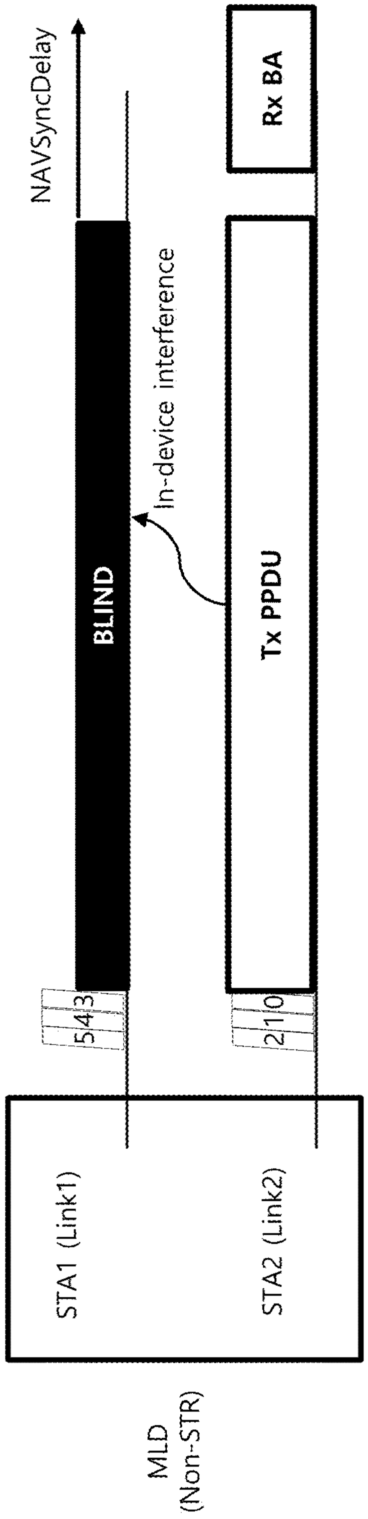
FIG. 11 illustrates an embodiment in which PPDU transmission performed by a particular STA of a non-STR MILD interrupts a channel access operation performed by another STA of the non-STR MLD.

FIG. 11 illustrates an embodiment in which PPDU transmission performed by a particular STA of a non-STR MLD interrupts a channel access operation performed by another STA of the non-STR MLD.

Referring to FIG. 11, a non-STR MLD may operate STA 1 and STA 2 in link 1 and link 2, respectively. If link 1 and link 2 is a link pair having a non-STR relationship, transmission performed by STA 1 and STA 2 may cause interference that is large enough to interrupt successful reception of a packet received in each of link 2 and link 1.

As illustrated in FIG. 11, due to interference incurred when STA 2 performs PPDU transmission in link 2, a CCA operation of STA 1 having been performing a backoff procedure in link 1 may be interrupted. In other words, interference incurred when STA 2 transmits a PPDU in link 2 may cause, in link 1, interference higher than a CCA energy (e.g., energy detection) threshold and, as a result, STA 1 having been performing a backoff procedure in link 1 may determine that link 1 is busy. Consequently, even though there is no other devices occupying link 1, STA 1 misidentifies link 1 as being in a busy state for a time for which STA 2 transmits the PPDU, and thus may fail to complete the backoff procedure.

As described above, when, due to in-device interference incurred when a particular STA of a non-STR MLD performs transmission, another STA in the non-STR MLD is unable to perform packet reception or a channel access procedure, we may say that the other STA is in a blind state.

When an STA of a non-STR MLD is in a blind state as described above, an MLD is neither able to receive a packet through the STA being in the blind state, nor able to perform an independent channel access (for transmission), and thus may not acquire any gain through a link in which the STA being in the blind state is operated. Therefore, a non-STR MLD may use a special channel access mechanism to prevent STAs operated in a link pair having a non-STR relationship from entering a blind state due to mutual transmission operations.

An MLD may defer (delay) starting transmission of a particular link even after termination of a channel access procedure of the particular link, so as to prevent STAs operated in a link pair having a non-STR relationship from entering a blind state due to mutual transmission operations.

Thereafter, starting transmission of the particular link may be performed at a time point when a channel access procedure of a link other than the particular link is completed, and consequently, transmission may be simultaneously performed in the particular link and the link other than the particular link. To this end, a mechanism by which a channel access procedure may be delayed without immediately starting transmission even after completion of the channel access procedure may be allowed to an MLD. The mechanism by which a channel access procedure may be delayed may correspond to allowing transmission to be deferred while maintaining a backoff counter (BO) as 0.

That is, even in a case where a channel access procedure is terminated in one link among multiple links of an MLD and thus the value of a backoff counter reaches "0", when a backoff counter value of another link has not reached "0", an STA of the MLD may not perform uplink transmission in the corresponding link and maintain the value of the backoff counter as 0. In other words, in a case where the value of a backoff counter reaches "0" in a particular link, when the value of a backoff counter in another link of an MLD has not reached "0", an STA of the MLD may select not performing uplink transmission and maintaining the value of the backoff counter as 0.

For example, multiple links of an MLD may be configured by a first link and a second link, a backoff procedure for channel access in the first link may be performed by a first backoff counter, and a backoff procedure for channel access in the second link may be performed by a second backoff counter. The backoff procedures may be individually performed through the first link and the second link included in the multiple links, respectively.

In this case, if one backoff counter among the first backoff counter and the second backoff counter has reached "0" earlier than the remaining backoff counter, a particular link using the one backoff counter among the first link and the second link may not perform the uplink transmission, and maintain the one backoff counter at the value of "0" until the remaining backoff counter reaches the value of "0". Alternatively, the one backoff counter may continuously maintain the value of "0" even after the remaining backoff counter has reached the value of "0".

A time point at which transmission is simultaneously performed in the particular link and the link other than the particular link may be positioned at a slot boundary at which a channel access procedure is completed in the link other than the particular link, or positioned in a slot next to the slot in which a channel access procedure is completed in the other link. Alternatively, a time point at which transmission is simultaneously performed in the particular link and the link other than the particular link may be positioned at a particular slot boundary after a channel access procedure is completed in the link other than the particular link. The particular slot boundary may be a slot boundary of the particular link immediately after the channel access procedure is completed in the other link.

That is, a slot configuration may vary for each link, and thus the boundaries of slots between links may not match each other. Therefore, the boundaries of slots between links may not match each other in relation to respective slots, the backoff counter of which decreases, and when all backoff counters of backoff procedures have reached "0" through a deferring operation described above in multiple links of the MILD, respectively, slot boundaries of respective links may not match each other. Slots of respective links may be individually configured, and thus slot boundaries of respective links may not match each other. Therefore, even when the values of backoff counters in respective links are all "0", slot boundaries may be different from each other. In this case, simultaneous transmission may be performed according to a slot boundary of a particular link among multiple links when the value of the backoff counter of the particular link is "0". That is, respective links do not perform uplink transmission according to slot boundaries of the links, and may defer or advance a transmission time point of uplink transmission according to a slot boundary of a particular link so as to simultaneously perform the uplink transmission.

For example, if multiple links of an MLD are configured by a first link and a second link, and one backoff counter among a first backoff counter of the first link and a second backoff counter of the second link has reached "0" earlier than the remaining backoff counter, the slot boundaries of the first link and the second link for uplink transmission may not match each other when the remaining backoff counter reaches "0". In this case, a transmission time point of uplink transmission in the second link may be adjusted by being advanced or delayed according to the slot boundary of the slot in which the first backoff counter of the first link is "0", or the slot boundary of a first slot which is next to the slot.

An uplink transmission time point in the first link and an uplink transmission time point in the second link may be within a particular time. For example, the uplink transmission time point in the second link may be positioned within 4 s from the uplink transmission time point in the first link.

Through the method described above, uplink transmission is performed at a different time point rather than the slot boundary of the slot in which the second backoff counter of the second link is "0" or the slot boundary of a second slot which is next to the slot, thereby uplink transmission may be simultaneously performed in the first link and the second link.

The simultaneous transmission may indicate a case where transmission is performed in respective links within a particular time.

An operation in which a multi-link device accesses channels in multiple links will be described with reference to FIG. 12 to FIG. 24. The multiple links may be a NSTR link pair.

Figure 12:
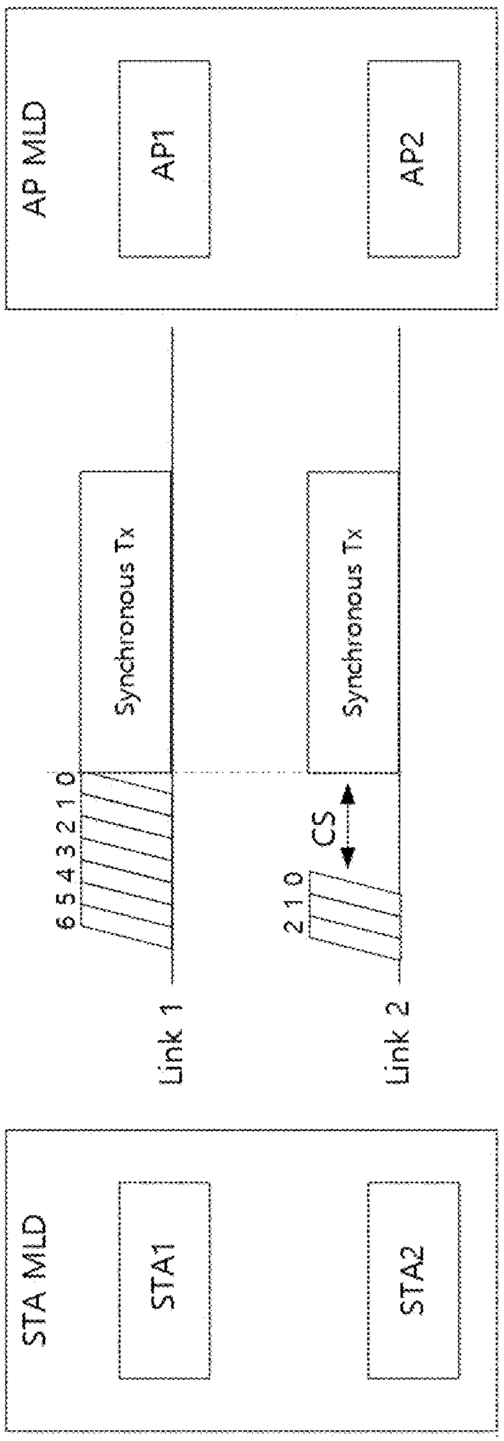
FIG. 12 illustrates a multi-link device delaying transmission in a link when succeeding in a channel access in the same link first according to an embodiment of the present invention.

FIG. 12 illustrates a multi-link device delaying transmission in a link when succeeding in a channel access in the same link first according to an embodiment of the present invention.

For convenience of explanation, it is assumed that a first station of the multi-link device operates in a first link and a second station operates in a second link. If the second station has succeeded in a channel access and the first station has failed in a channel access, the second station may wait until the first station succeeds in the channel access, while maintaining 0 as the value of a backoff counter. When the first station succeeds in the channel access, the first station and the second station may start synchronized transmission. The synchronized transmission may be transmission, the transmission start time point of which is started within a pre-designated time. While the second station maintains the value of the backoff counter, the second station may perform channel sensing. The channel sensing may include at least one of energy detection (ED), preamble detection (PD), and network allocation (NAV) identification. The second station may start synchronized transmission when the first station succeeds in the channel access and a sensing result indicates an idle state.

In the embodiment of FIG. 12, the first station (STA 1) of the multi-link device is connected to a first AP (AP 1) in the first link (link 1). The second station (STA 2) is connected to a second AP (AP) in the second link (link 2). The second station (STA 2) succeeds in a channel access first, and the second station (STA 2) does not perform transmission while maintaining 0 as the value of a backoff counter until the first station (STA 2) succeeds in a channel access. The second station (STA 2) performs channel sensing. When the first station (STA 1) succeeds in the channel access, the first station (STA 1) and the second station (STA 2) start synchronized transmission.

While the second station delays transmission, a channel which the first station accesses may be detected as being in a busy state. The second station (STA 2) may start non-synchronized transmission. Another specific embodiments will be described with reference to FIG. 13 and FIG. 14.

Figure 13:
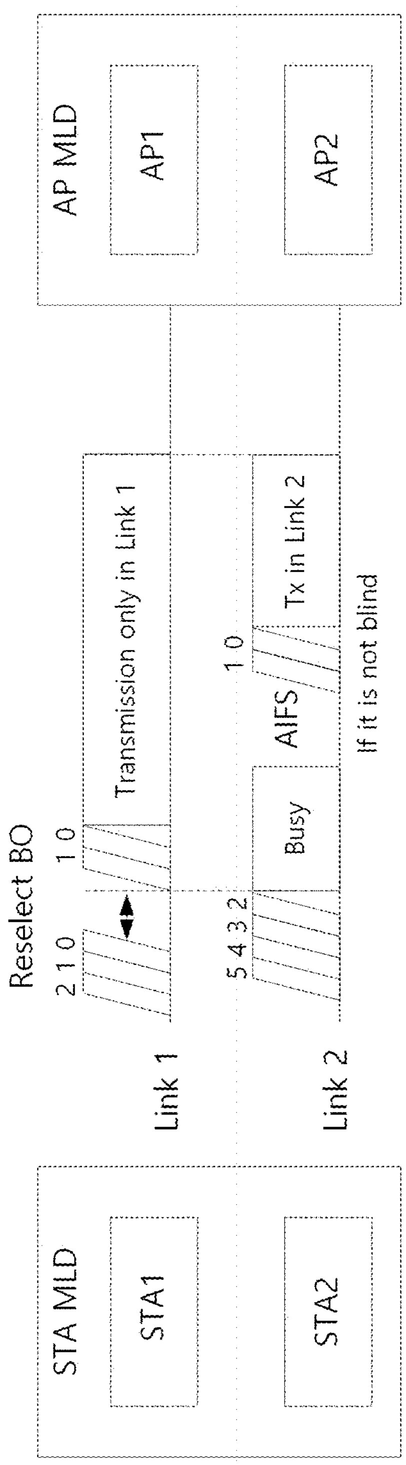
FIG. 13 illustrates an operation of a multi-link device in a case where a channel of a second link is detected as being in a busy state, when the multi-link device delays transmission in a first link after succeeding in a channel access in the first link first according to an embodiment of the present invention.

FIG. 13 illustrates an operation of a multi-link device in a case where a channel of a second link is detected as being in a busy state, when the multi-link device delays transmission in a first link after succeeding in a channel access in the first link first according to an embodiment of the present invention.

In a case where, while the first station delays transmission, a channel which the second station accesses is detected as being in a busy state, the first station may obtain a new backoff counter and perform a channel access procedure. When the first station succeeds in a channel access, the first station may perform non-synchronized transmission. In a specific embodiment, the first station may perform channel sensing for the newly obtained backoff counter x slot duration. That is, an operation of detecting whether a channel is idle during an AIFS may be omitted in general channel access. In another specific embodiment, when a channel is idle during an AIFS as in the general channel access, the first station may perform channel sensing for the newly obtained backoff counter x slot duration. As described above, when the second station obtains a new backoff counter, the first station may maintain the size of a CW used before thereby without change. The second station may continuously perform a channel access procedure.

In the embodiment of FIG. 13, the first station (STA 1) of the multi-link device is connected to a first AP (AP 1) in the first link (link 1). The second station (STA 2) is connected to a second AP (AP) in the second link (link 2). The first station (STA 1) succeeds in a channel access first, and the first station (STA 1) does not perform transmission while maintaining 0 as the value of a backoff counter until the second station (STA 2) succeeds in a channel access. A channel of the second link is detected as being busy. The first station (STA 1) obtains a new backoff counter, and performs channel sensing for slots corresponding to the backoff counter. When the first station (STA 1) succeeds in a channel access, the first station (STA 2) starts non-synchronized transmission.

Figure 14:
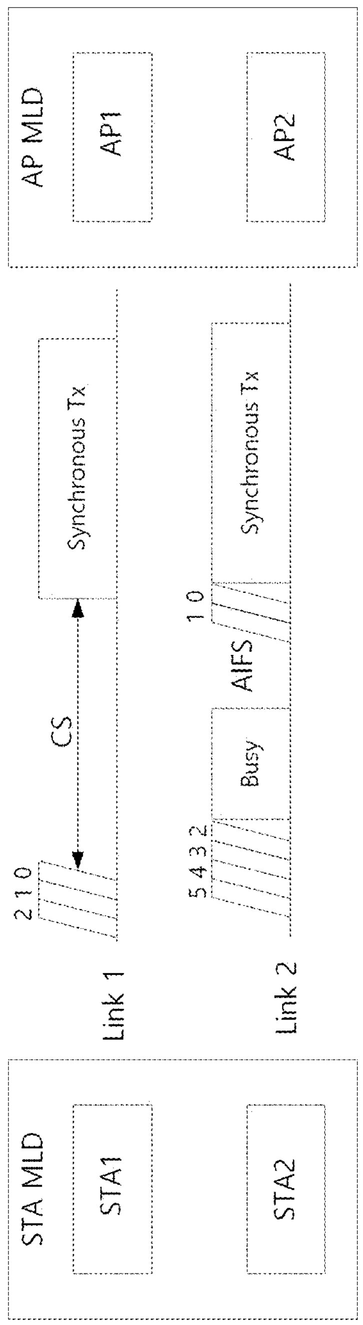
FIG. 14 illustrates an operation of a multi-link device in a case where a channel of a second link is detected as being in a busy state, when the multi-link device delays transmission in a first link after succeeding in a channel access in the first link first according to another embodiment of the present invention.

FIG. 14 illustrates an operation of a multi-link device in a case where a channel of a second link is detected as being in a busy state, when the multi-link device delays transmission in a first link after succeeding in a channel access in the first link first according to another embodiment of the present invention.

Even in a case where, while the first station delays transmission, a channel which the second station accesses is detected as being in a busy state, the first station may delay the transmission until the second station succeeds in a channel access. The first station may perform channel sensing until the second station succeeds in the channel access.

In the embodiment of FIG. 14, the first station (STA 1) of the multi-link device is connected to a first AP (AP 1) in the first link (link 1). The second station (STA 2) is connected to a second AP (AP) in the second link (link 2). The first station (STA 1) succeeds in a channel access first, and the first station (STA 1) does not perform transmission while maintaining 0 as the value of a backoff counter until the second station (STA 2) succeeds in a channel access. A channel of the second link is detected as being busy. The first station (STA 1) delays transmission until the second station (STA 2) succeeds in the channel access, while performing channel sensing. When the second station (STA 2) succeeds in the channel access, the first station (STA 2) starts non-synchronized transmission.

In the embodiments described with reference to FIG. 13 and FIG. 14, the first station may determine whether to perform synchronized transmission, based on the duration of a time for which the channel of the second link is maintained at a busy state. For example, when the duration of the time for which the channel of the second link is maintained at a busy state is greater than a pre-designated value, the first station may perform non-synchronized transmission. The first station may obtain a new backoff counter and perform a channel access, based on the obtained backoff counter. When the first station succeeds in the channel access, the first station may perform non-synchronized transmission.

When the duration of the time for which the channel of the second link is maintained at a busy state is smaller than or equal to the pre-designated value, the first station may perform synchronized transmission. The first station may delay transmission until the second station succeeds in the channel access. The first station may perform channel sensing until the second station succeeds in the channel access.

In the above embodiments, when the multi-link device excessively delays transmission in one link, a probability of transmission collision may be increased. This will be explained with reference to FIG. 15.

Figure 15:
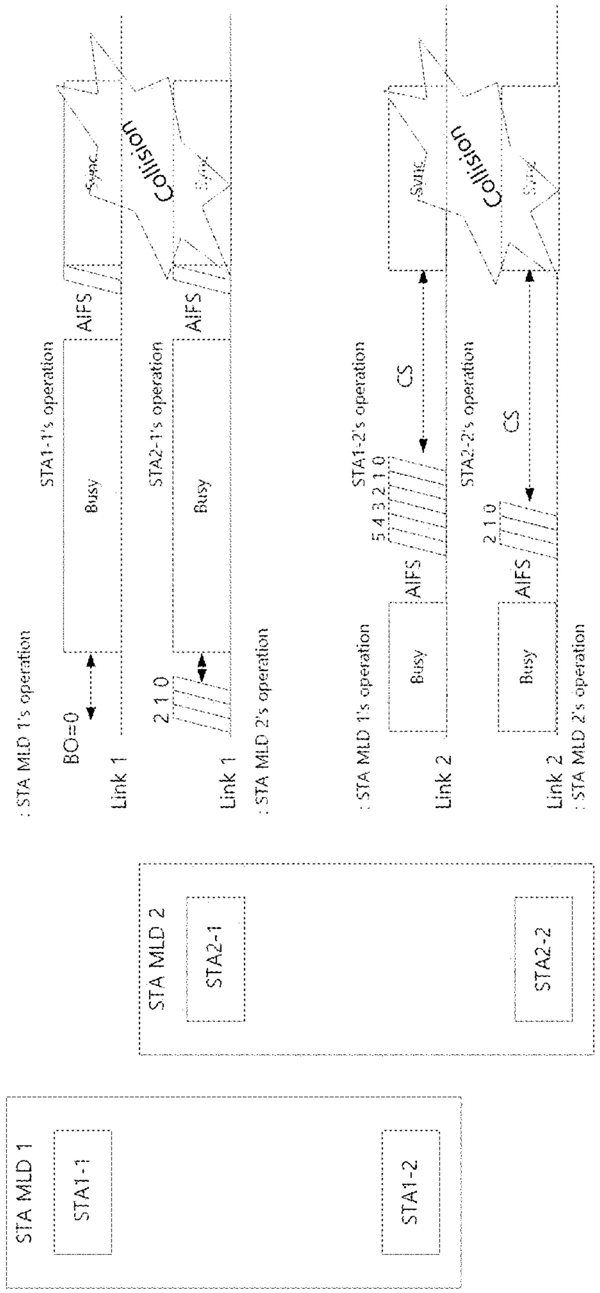
FIG. 15 illustrates an operation of multiple multi-link devices in a case where the multiple multi-link devices delays transmission in a first link after succeeding in a channel access in the first link first according to an embodiment of the present invention.

FIG. 15 illustrates an operation of multiple multi-link devices in a case where the multiple multi-link devices delays transmission in a first link after succeeding in a channel access in the first link first according to an embodiment of the present invention.

In a case where the multiple multi-link devices operate all in the first link and the second link, the multiple multi-link devices perform synchronized transmission in the first link and the second link, and transmission collision occurs in the first link, transmission collision also occurs in the second link.

In the embodiment of FIG. 15, a first multi-link device (STA MLD 1) and a second multi-link device (STA MLD 2) all operate in the first link (link 1) and the second link (link 2). The first multi-link device (STA MLD 1) and the second multi-link device (STA MLD 2) all succeed in channel accesses in the second link (link 2), and delay transmission in the second link (link 2) until channel accesses in the first link (link 1) are successful. The first multi-link device (STA MLD 1) and the second multi-link device (STA MLD 2) simultaneously succeed in the channel accesses in the first link (link 1), and transmission collision occurs in both of the first link (link 1) and the second link (link 2).

An operation of a multi-link device in which, while the multi-link device delays transmission in one link, the link is detected as being busy will be described with reference to FIG. 17.

Figure 16:
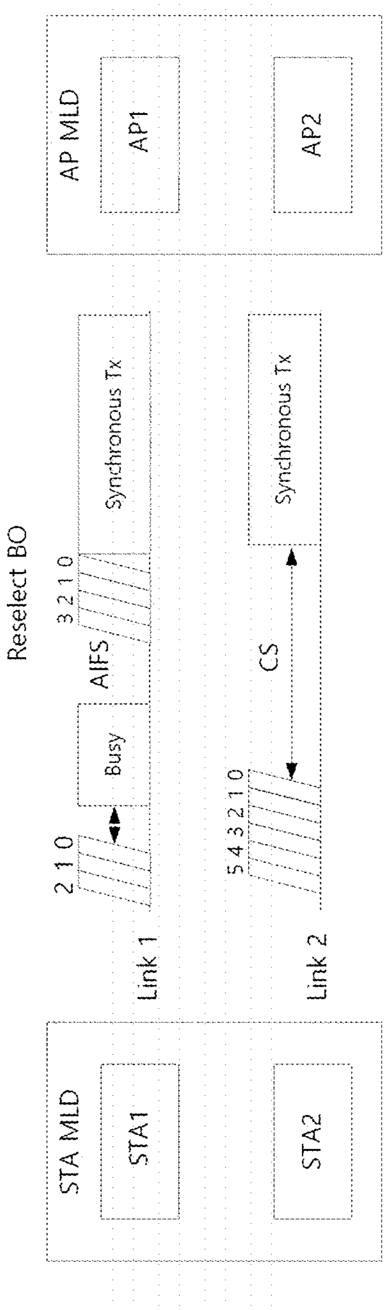
FIG. 16 illustrates an operation of a multi-link device in a case where, after succeeding in a channel access in a first link first, the multi-link device delays transmission in the first link and a channel of the first link is detected as being busy according to an embodiment of the present invention.
Figure 17:
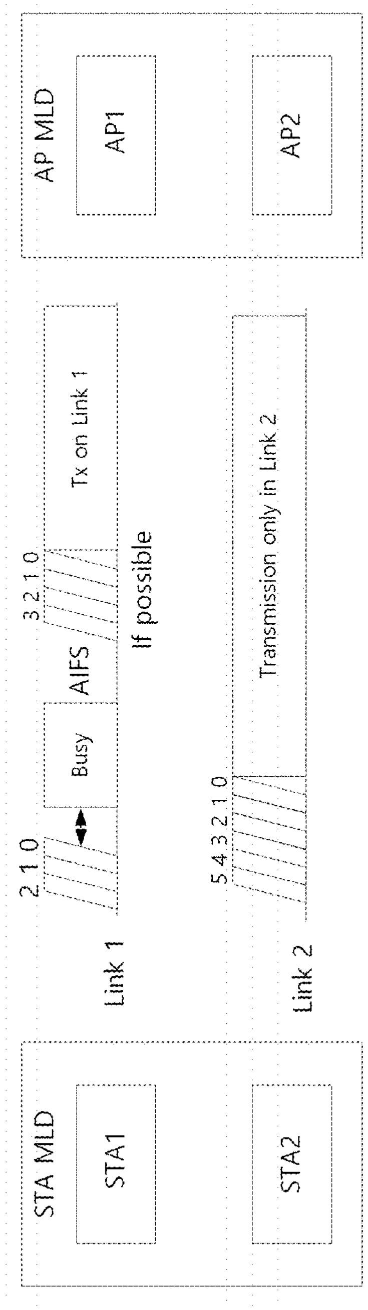
FIG. 17 illustrates an operation of a multi-link device in a case where, after succeeding in a channel access in a first link first, the multi-link device delays transmission in the first link and a channel of the first link is detected as being busy according to another example of the present invention.

FIG. 16 and FIG. 17 illustrate an operation of a multi-link device in a case where, after succeeding in a channel access in a first link first, the multi-link device delays transmission in the first link and a channel of the first link is detected as being busy according to an embodiment of the present invention.

In a case where, while the first station delays transmission, a channel which the first station accesses is detected as being in a busy state, the first station may obtain a new backoff counter and perform a channel access procedure. The first station may maintain the value of a CW at the value of a CW used before.

While the first station delays transmission, when a channel which the first station accesses is detected as being in a busy state, the second station may succeeds in a channel access. The second station may delay transmission until the first station succeeds in a channel access. In another specific embodiment, the second station may perform non-synchronized transmission without delaying transmission.

In the embodiments of FIG. 16 and FIG. 17, the first station (STA 1) of the multi-link device is connected to a first AP (AP 1) in the first link (link 1). The second station (STA 2) is connected to a second AP (AP) in the second link (link 2). The first station (STA 1) succeeds in a channel access first, and the first station (STA 1) delays transmission. The first station (STA 1) determines that a channel of the first link (link 1) is busy. The first station (STA 1) obtains a new backoff counter, and performs a channel access. In the embodiment of FIG. 17, the second station (STA 2) succeeds in a channel access first, and delays transmission until the first station (STA 1) succeeds in a channel access. When the first station (STA 1) succeeds in the channel access, the first station (STA 1) and the second station (STA 2) start synchronized transmission. In the embodiment of FIG. 17, the second station (STA 2) succeeds in a channel access first, and performs non-synchronized transmission without delaying transmission.

As in the embodiments described above, for synchronized transmission, it is necessary to succeed in channel accesses in different links and, at the same time, the channels are required to be idle. Therefore, a time point at which a multi-link device is able to perform synchronized transmission may be restricted, and transmission of the multi-link device may be excessively delayed. This will be explained with reference to FIG. 19.

Figure 18:
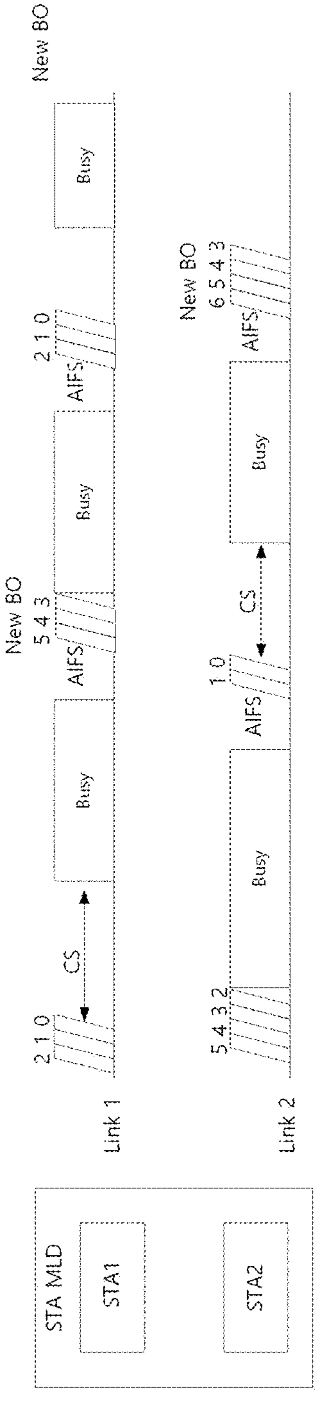
FIG. 18 shows transmission delay caused while a multi-link device performs a channel access for synchronized transmission according to an embodiment of the present invention.

FIG. 18 shows transmission delay caused while a multi-link device performs a channel access for synchronized transmission according to an embodiment of the present invention.

The first station (STA 1) of the multi-link device is connected to a first AP (AP 1) in the first link (link 1). The second station (STA 2) is connected to a second AP (AP) in the second link (link 2). The first station (STA 1) succeeds in a channel access first, and the first station (STA 1) delays transmission. Before the second station (STA 2) succeeds in a channel access, the first station (STA 1) detects a channel of the first link (link 1) as being busy. Therefore, the first station (STA 1) obtains a new backoff counter, and starts a channel access procedure again. The second station (STA 2) succeeds in the channel access, and delays transmission because the first station (STA 1) is performing a channel access. Before the first station (STA 1) succeeds in the channel access, the second station (STA 2) detects a channel of the second link (link 2) as being busy. Therefore, the second station (STA 2) obtains a new backoff counter, and starts a channel access procedure again. Consequently, even when the first station (STA 1) and the second station (STA 2) all succeeded in the channel accesses, the first station and the second station did not perform transmission.

As described above, when transmission delay and channel access procedures are unconditionally repeated, transmission may be excessively delayed. A method in which a station of a multi-link device determines whether to perform a new backoff procedure during transmission delay will be described with reference to FIG. 20.

Figure 19:
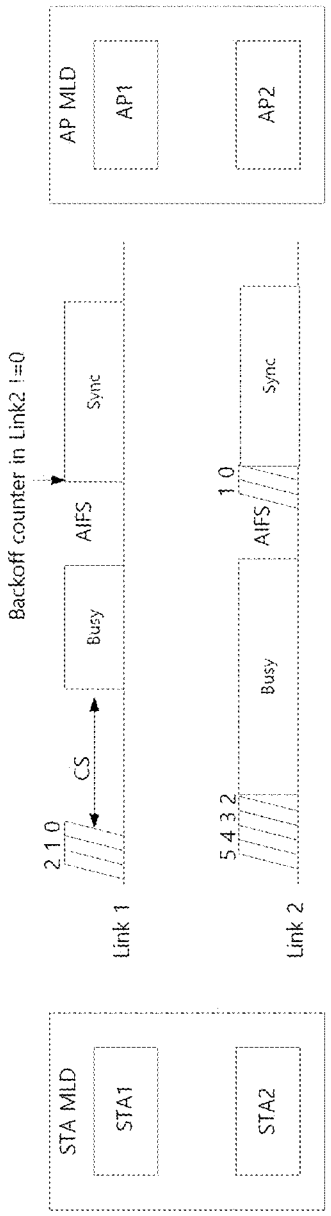
FIG. 19 illustrates an operation method in a case where a station of a multi-link device detects a channel as being busy during transmission according to an embodiment of the present invention.
Figure 20:
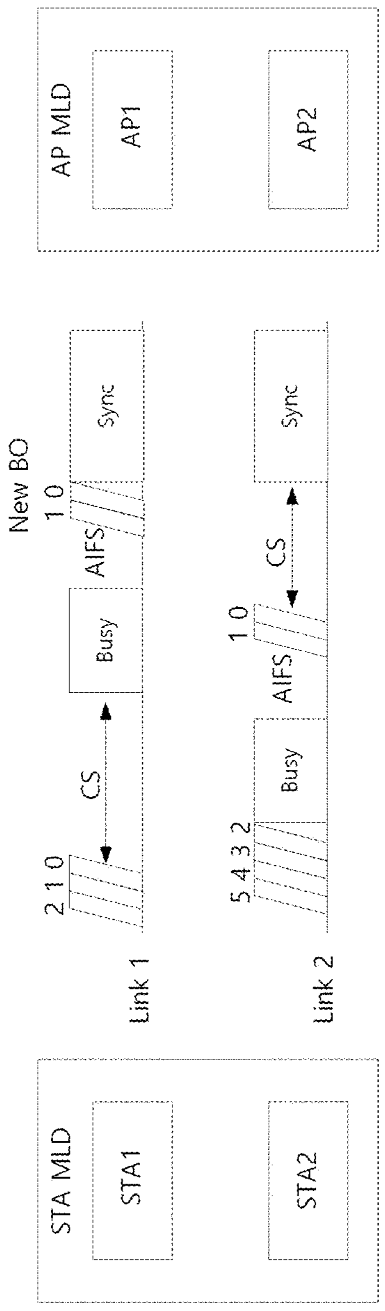
FIG. 20 illustrates an operation method in a case where a station of a multi-link device detects a channel as being busy during transmission according to another example of the present invention.

FIG. 19 and FIG. 20 illustrate an operation method in a case where a station of a multi-link device detects a channel as being busy during transmission according to an embodiment of the present invention.

A station of a multi-link device may detect a channel as being busy during transmission delay. The station may determine whether to start a channel access procedure again, according to a channel access state of another station of the multi-link device at a time point of determining the channel as being idle again. Specifically, the station may determine whether to obtain a new backoff counter and perform a channel access, according to a channel access state of another station of the multi-link device at a time point of determining the channel as being idle again. If a backoff procedure of the second station is in progress at a time point at which the first station determines that the channel is idle again, the first station may delay transmission. In addition, if the second station is successful in a channel access at a time point at which the first station determines that the channel is idle again, the first station may obtain a new backoff counter and perform a channel access procedure.

The station may determine that the channel is idle, when the channel is detected as being continuously idle for a pre-designated time interval. The pre-designated time interval may be an AIFS. In another specific embodiment, the pre-designated time interval may be a time interval remaining after excluding a time required to switch between reception/transmission from the AIFS.

In the embodiments of FIG. 19 and FIG. 20, the first station (STA 1) of the multi-link device is connected to a first AP (AP 1) in the first link (link 1). The second station (STA 2) is connected to a second AP (AP) in the second link (link 2). The first station (STA 1) succeeds in a channel access first, and the first station (STA 1) delays transmission. Before the second station (STA 2) succeeds in a channel access, the first station (STA 1) detects a channel of the first link (link 1) as being busy. In the embodiment of FIG. 20, when the first station (STA 1) detects the channel as being idle again, the second station (STA 2) is in a channel access procedure. Therefore, the first station (STA 1) does not obtain a new backoff counter, and performs only channel sensing. When the second station (STA 2) succeeds in the channel access, the first station (STA 1) and the second station (STA 2) perform synchronized transmission.

In the embodiment of FIG. 20, when the first station (STA 1) detects the channel as being idle again, the second station (STA 2) has succeeded in the channel access and is delaying transmission. Therefore, the first station (STA 1) obtains a new backoff counter, and performs a channel access. When the first station (STA 1) succeeds in the channel access, the first station (STA 1) and the second station (STA 2) perform synchronized transmission.

Figure 21:
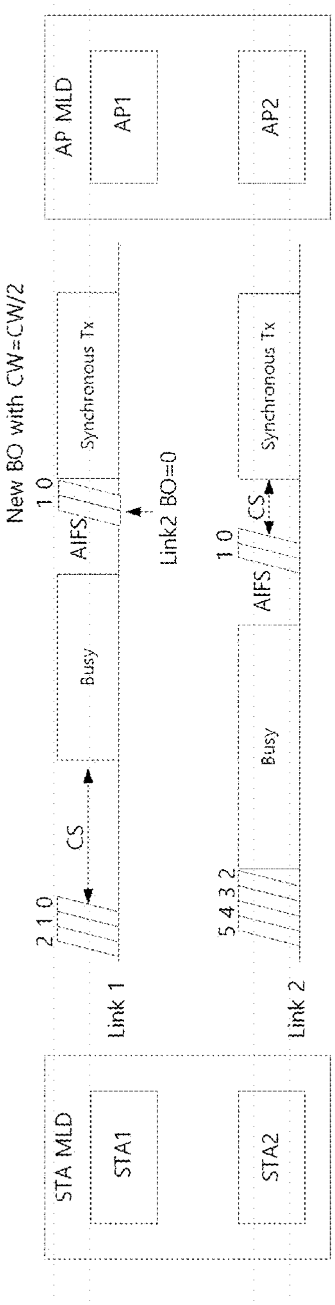
FIG. 21 illustrates a method of obtaining a new backoff counter value in a case where a station of a multi-link device detects a channel as being busy during transmission delay according to an embodiment of the present invention.

FIG. 21 illustrates a method of obtaining a new backoff counter value in a case where a station of a multi-link device detects a channel as being busy during transmission delay according to an embodiment of the present invention.

In the embodiments described above, when a station of a multi-link device detects a channel as being busy during transmission and then obtains a backoff counter again, the station may configure, as the value of a CW, a value smaller than the CW value used before. For example, the station may configure, as the value of a CW, ½ of the CW value used before. In another specific embodiment, the station may configure, as the value of a CW, a floor value of ½ of the CW value used before. Immediately after a channel access procedure using the newly obtained backoff counter is successful, the station may transmit only a pre-designated type of frame. A pre-designated frame may be an RTS frame or a MU-RTS frame. In another detailed embodiment, the pre-designated frame may be a BQRP frame.

If transmission performed immediately after success of the channel access procedure using the newly obtained backoff counter fails, the station may configure, as the value of the CW, the CW value before adjustment x 2-1. That is, the station may configure, as the value of the CW, the CW value before transmission delay x 2-1.

In the embodiment of FIG. 21, the first station (STA 1) is connected to a first AP (AP 1) in the first link (link 1). The second station (STA 2) is connected to a second AP (AP) in the second link (link 2). The first station (STA 1) succeeds in a channel access first, and the first station (STA 1) delays transmission. Before the second station (STA 2) succeeds in a channel access, the first station (STA 1) detects a channel of the first link (link 1) as being busy. The first station (STA 1) may configure a CW to have a value of ½ of the CW value used before, and obtain the value of a new backoff counter. After the second station (STA 2) succeeds in the channel access, when the first station (STA 1) succeeds in a channel access again, the first station (STA 1) and the second station (STA 2) perform synchronized transmission.

Figure 22:
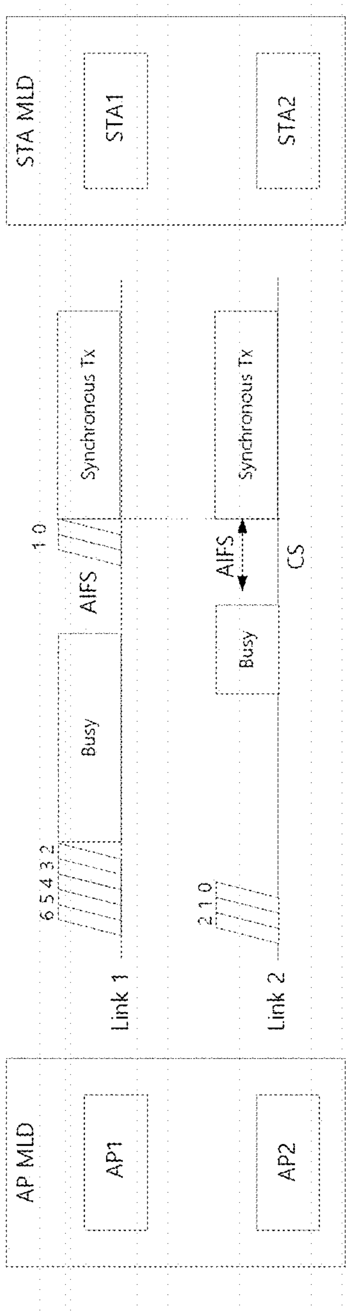
FIG. 22 shows an operation in which a station of a multi-link device determines whether to perform synchronized transmission while delaying transmission according to an embodiment of the present invention.

FIG. 22 shows an operation in which a station of a multi-link device determines whether to perform synchronized transmission while delaying transmission according to an embodiment of the present invention.

For convenience of explanation, it is assumed that a first station of the multi-link device operates in a first link and a second station of the multi-link device operates in a second link. In a case where the second station succeeds in a channel access while the first station delays transmission, the first station may determine whether to perform synchronized transmission together with the second station, based on whether a channel of the first link is continuously idle for a pre-designated interval until the second station succeeds in the channel access. Specifically, when the channel of the first link is continuously idle for the pre-designated interval until the second station succeeds in the channel access, the first station may perform synchronized transmission together with the second station. The pre-designated interval may be a DIFS. In addition, the pre-designated interval may be a PIFS. In addition, the pre-designated interval may be an AIFS. The value of the AIFS may be determined according to an AC of a frame which the first station is to transmit. Specifically, the value of the AIFS may be an AIFS corresponding to an AC having a high priority among ACs of a frame which the first station is to transmit.

In the embodiment of FIG. 22, the first station (STA 1) is connected to a first AP (AP 1) in the first link (link 1). The second station (STA 2) is connected to a second AP (AP) in the second link (link 2). The second station (STA 2) succeeds in a channel access first, and the second station (STA 2) delays transmission. Before the first station (STA 1) succeeds in a channel access, the second station (STA 2) detects a channel of the second link (link 2) as being busy. Even though the channel of the second link (link 2) has been detected as being busy, the second station (STA 2) continuously maintains transmission delay. When the first station (STA 1) succeeds in the channel access, the second station (STA 2) determines whether the channel of the second link (link 2) is continuously idle during an AIFS. When the first station (STA 1) succeeds in the channel access, the channel of the second link (link 2) has been continuously idle during the AIFS, and thus the first station (STA 1) and the second station (STA 2) perform synchronized transmission.

Figure 23:
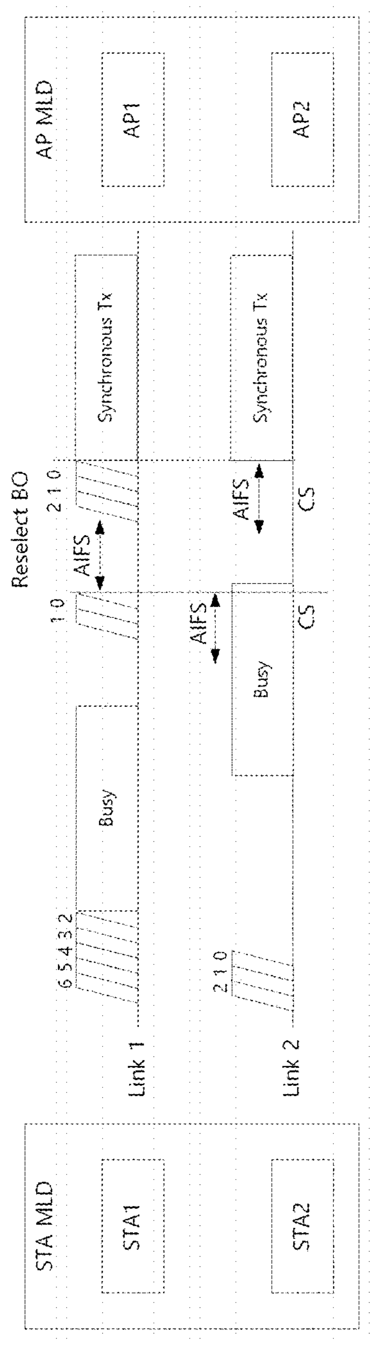
FIG. 23 illustrates an operation of multiple links in a case where a station of a multi-link device detects a channel which is subject to transmission delay as being busy while delaying transmission according to an embodiment of the present invention.
Figure 24:
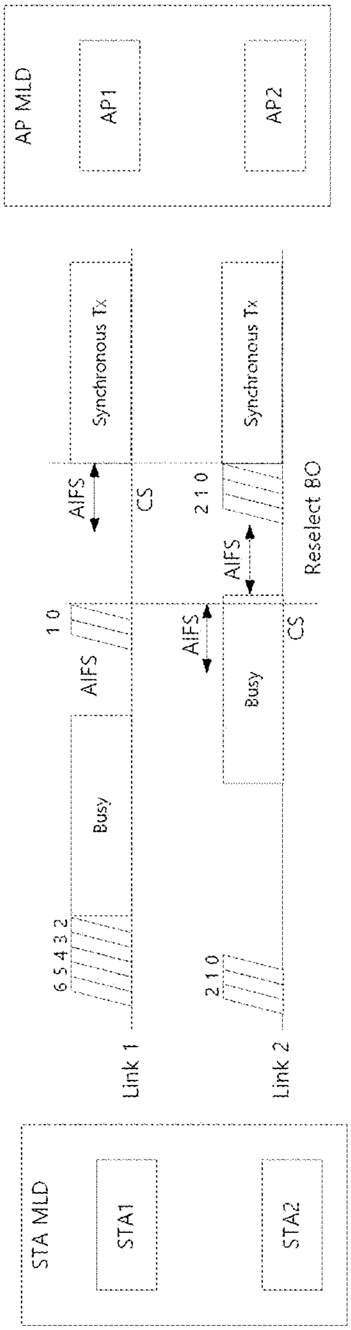
FIG. 24 illustrates an operation of multiple links in a case where a station of a multi-link device detects a channel which is subject to transmission delay as being busy while delaying transmission according to another example of the present invention.

FIG. 23 and FIG. 24 illustrate an operation of multiple links in a case where a station of a multi-link device detects a channel which is subject to transmission delay as being busy while delaying transmission according to an embodiment of the present invention.

The embodiments described with reference to FIG. 22, while the first station is waiting to perform transmission, when the second station succeeds in a channel access, the first station may determine that a channel of the first link is busy. The second station may obtain a new backoff counter and perform a channel access. The second station may configure a CW to have the same value as the CW value used before, to obtain the backoff counter. In another specific embodiment, the first station may obtain a new backoff counter and perform a channel access. The first station may configure a CW to have the same value as the CW value used before, to obtain the backoff counter.

In the embodiments of FIG. 23 and FIG. 24, the first station (STA 1) is connected to a first AP (AP 1) in the first link (link 1). The second station (STA 2) is connected to a second AP (AP) in the second link (link 2). The second station (STA 2) succeeds in a channel access first, and the second station (STA 2) delays transmission. When the first station (STA 1) succeeds in a channel access, the second station (STA 2) detects a channel of the second link (link 2) as having not been continuously busy during an AIFS.

In the embodiment of FIG. 23, the first station (STA 1) obtains a new backoff counter, and performs a channel access. The second station (STA 2) delays transmission. Thereafter, when the first station (STA 1) succeeds in the channel access, the channel of the second link (link 2) is detected as being continuously idle during an AIFS. Therefore, the first station (STA 1) and the second station (STA 2) perform synchronized transmission.

In the embodiment of FIG. 24, the second station (STA 2) obtains a new backoff counter, and performs a channel access. The first station (STA 1) delays transmission. Thereafter, when the second station (STA 2) succeeds in the channel access, a channel of the first link (link 1) is detected as being continuously idle during an AIFS. Therefore, the first station (STA 1) and the second station (STA 2) perform synchronized transmission.

A method of applying EDCA to synchronized transmission described above will be described with reference to FIG. 25 to FIG. 29.

Figure 25:
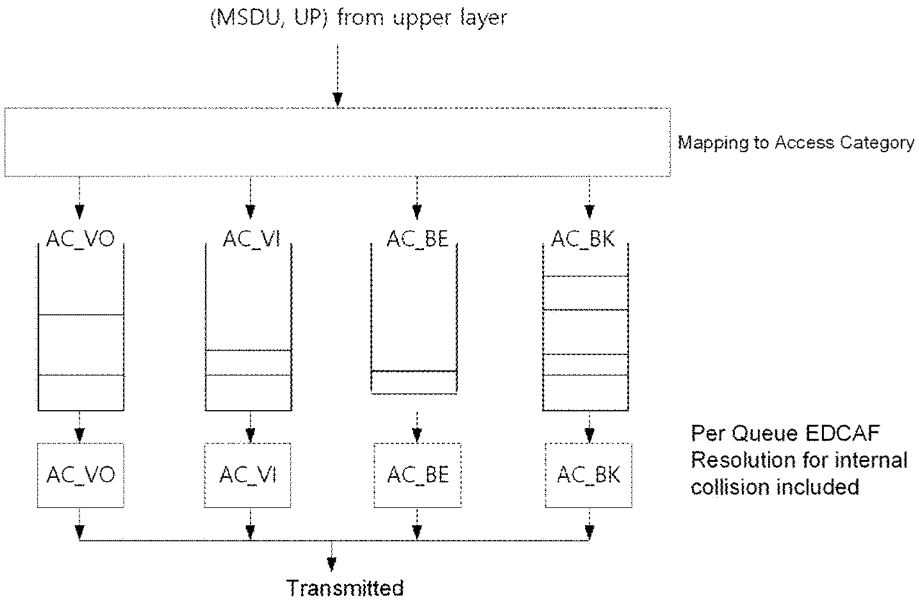
FIG. 25 shows an EDCA queue used when an EDCA is applied according to an embodiment of the present invention.

FIG. 25 shows an EDCA queue used when an EDCA is applied according to an embodiment of the present invention.

An order of transmission processing is determined according to the priority of traffic transmitted when EDCA is applied. The priority of traffic may be determined according to the type or traffic ID (TID) of the traffic. The priority of traffic may be classified as one of AC_VO, AC_VI, AC_BE, and AC_BK. Each AC may be represented as follows.

1) AC_VO: Voice
2) AC_VI: Video
3) AC_BE: Best Effort
4) AC_BK: Back Ground

The priority of the four ACs may decrease in the order of AC_VO, AC_VI, AC_BE, and AC_BK. Specifically, ACs may affect a channel access procedure as below.

In the embodiments described above, an AIFS may be defined by SIFS+AIFSN[AC] *aSlotTime. aSlotTime is the time of one slot that is a unit used when a station performs a backoff operation for frame transmission. aSlotTime may be defined by 9μ when the bandwidth of a basic signal used in a BSS is 20 MHz. In addition, a minimum value (CWmin) of a contention window (CW) and a maximum value (CWmax) of the CW may vary according to each AC. An AIFSN and a CWmax value basically configured for each AC may be shown as in Table 1 below.

TABLE 1

| AC | AIFSN | CWmin | CWmax |
|---|---|---|---|
| AC_VO | 2 | 3 | 7 |
| AC_VI | 2 | 7 | 15 |
| AC_BE | 3 | 15 | 1023 |
| AC_BK | 7 | 15 | 1023 |

An independent EDCA queue may be configured for each AC. When a station receives traffic to be transmitted, from a higher layer, the station may store the received traffic in an EDCA queue corresponding to an AC of the received traffic. An independent EDCAF operation may be performed in each EDCA queue. FIG. shows, as described above, a station receiving traffic to be transmitted, from a higher layer and storing the received traffic in an EDCA queue corresponding to an AC of the received traffic.

Figure 26:
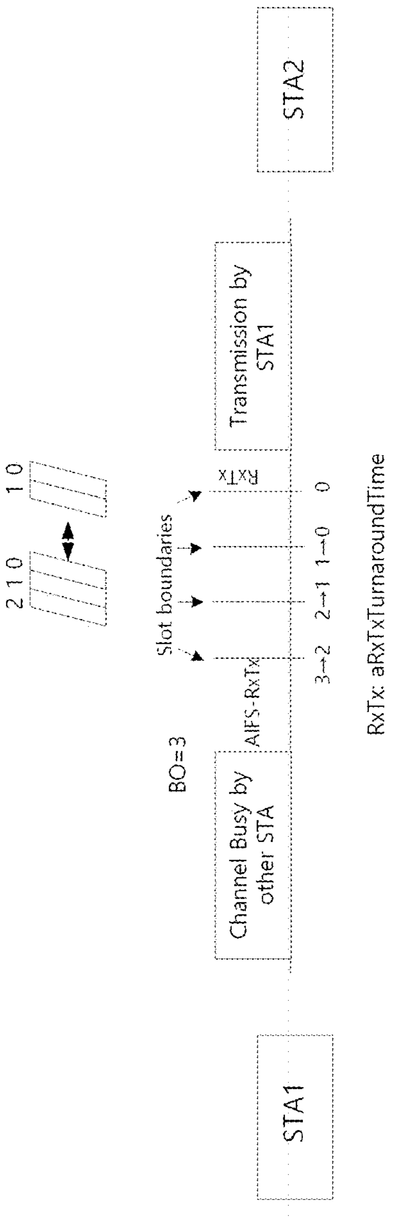
FIG. 26 illustrates a method of performing a channel access, based on a slot boundary according to an embodiment of the present invention.

FIG. 26 illustrates a method of performing a channel access, based on a slot boundary according to an embodiment of the present invention.

A slot boundary in a backoff procedure may be defined as at least one of the following contents.

1) In a case where a channel occupation situation is generated by a frame transmitted by another terminal and a frame reception error situation has not occurred, if a channel state is in a channel idle state for a time of AIFSN[AC]*SlotTime−aRxTxTurnaroundTime after passage of an SIFS time from a time point at which a corresponding occupation time is completed, a time point when the time has passed 2) In a case where a channel occupation situation is generated by a frame transmitted by another station and a frame reception error situation occurs, if a channel state is in a channel idle state for a time of (EIFS−DIFS+AIFSN[AC] *aSlotTime+aSIFSTime−aRxTxTurnaroundTime) from a time point at which a channel occupation state by physical detection is completed, a time point when the time has passed 3) After a frame requesting transmission of a response frame (e.g., ACK frame or BlockAck frame) is transmitted, the earlier time point among the following two time points A) If a channel state is in a channel idle state for a time of AIFSN[AC] *aSlotTime+aSIFSTime−aRxTxTurnaroundTime after a reception expiration time point for reception of a response frame after a transmission end time point of a PPDU including a frame, a time point when the time of AIFSN[AC] *aSlotTime+aSIFSTime−aRxTxTurnaroundTime has passed from the reception expiration time point B) In a case where a response frame is received, if a channel state is in a channel idle state for a time of AIFSN[AC]*aSlotTime−aRxTxTurnaroundTime after passage of an SIFS time from a reception end time point of a PPDU including the response frame, a time point when the time of AIFSN[AC]*SlotTime−aRxTxTurnaroundTime has passed after passage of the SIFS time from the reception end time point of the PPDU 4) If a channel state is in a channel idle state for a time of AIFSN[AC]*SlotTime−aRxTxTurnaroundTime after passage of an SIFS time from a transmission end time point of a PPDU including a frame not requesting transmission of a response frame, a time point when the time of AIFSN[AC] *SlotTime−aRxTxTurnaroundTime has passed after passage of the SIFS time from the transmission end time point of the PPDU If a channel state is in a channel idle state for a time of AIFSN[AC] *aSlotTime+aSIFSTime−aRxTxTurnaroundTime after a random channel occupation time not corresponding to conditions 1-4, a time point when the time of AIFSN[AC]*aSlotTime+aSIFSTime−aRxTxTurnaroundTime has passed If a channel state is in a channel idle state for a time of aSlotTime from a previous slot boundary time point, a termination time point of aSlotTime aRxTxTurnaroundTime may be called a time required for a transceiver of a station to switch from a reception mode to a transmission mode. The time required to switching may be 4 μs.

The EDCAF of the station may perform one of the following operations at each slot boundary time point:

1) Reduce a backoff value by 1
2) Perform a frame transmission operation
3) Generate a new backoff value due to internal collision and perform a backoff operation
4) Perform no operation In a case where, at a slot boundary, a frame to be transmitted is in an EDCA queue of a station, a backoff value is 0, and a situation is not the situation where a frame belonging to an AC having a higher priority than that of the EDCA queue is transmitted (i.e., the situation is not an internal collision situation), the station transmits the frame stored in the EDCA queue at the slot boundary.

The EDCAF operated in the station may be required to perform a backoff operation when one or more situations among the following situations occur:

1) When a frame to be transmitted is generated in the station, the frame is the first frame stored in an EDCA queue and a channel is busy at a time point at which the frame is generated.
2) A frame transmission operation of the station is completed, or a TXOP that has been obtained by the station for frame transmission expires.
3) A TXOP is obtained and a frame is transmitted according to an EDCAF operation, but transmission of the first frame transmitted in the obtained TXOP fails.
4) A frame collision situation occurs in an EDCA queue, and an AC of a frame incurring collision corresponds to an AC having a higher priority than that of a frame to be transmitted.

An operation of determining a channel state of the channel in the situation 1) above may be performed by the station through an operation of identifying a configured network allocation vector (NAV) value through physical carrier sensing (CS) by which a reception energy level is measured, virtual CS by which the signal length of a corresponding signal is recognized through a preamble including the received frame, and a duration field of the received frame. If the station is a mesh station, the channel state may be additionally identified through identification of the NAV value.

The EDCAF operated in the station may perform a backoff operation when one situation among the following situations occurs:

1) A frame transmission operation of a frame other than the first frame in an obtained TXOP fails
2) A frame is to be transmitted using a 40 MHz/80 MHz/160 MHz/320 MHz bandwidth through a channel expansion operation, but the channel state of a secondary channel is determined as a channel occupation state and thus a channel access operation is to be performed again.

As described above, in a case where, at a slot boundary, a station has a frame to be transmitted, in an EDCA queue, a backoff value is 0, and a situation is the situation where a frame corresponding to an AC having a higher priority than that of the EDCA queue is transmitted, the station may recognize that internal collision has occurred. The station may obtain a new backoff value for the EDCA queue and perform a backoff operation again.

When a frame to be transmitted is generated in the station, if the frame is the first frame stored in the EDCA queue and a channel is a channel occupation (busy) state at a time point at which the frame is generated, the station may generate a new backoff value and perform a backoff operation. The backoff value may be configured by randomly selecting one number among 0 to (contention window value-1) numbers. For example, when a frame to be transmitted by the station is generated, a channel may be in a channel occupation state at a corresponding time point, and a backoff value of 3 may be obtained according to a backoff operation. After the channel occupation time point, according to definition 1) of a slot boundary, the next slot boundary may be a time point after a time of AIFS-aRxTxTurnaroundTime has passed after completion of the channel occupation time. After the channel occupation time point, when the channel is continuously maintained at a channel idle state, the slot boundaries thereafter may come every time aSlotTime has passed. When the backoff value is not 0 at each slot boundary, the backoff value for transmission of the frame may be reduced by 1. If the backoff value is 0 at a slot boundary, the station may switch a transceiver to a transmission mode to transmit the frame except for an internal collision situation described above, and then may transmit the frame.

An EDCAF operation for performing synchronized transmission will be described with reference to FIG. 28.

Figure 27:
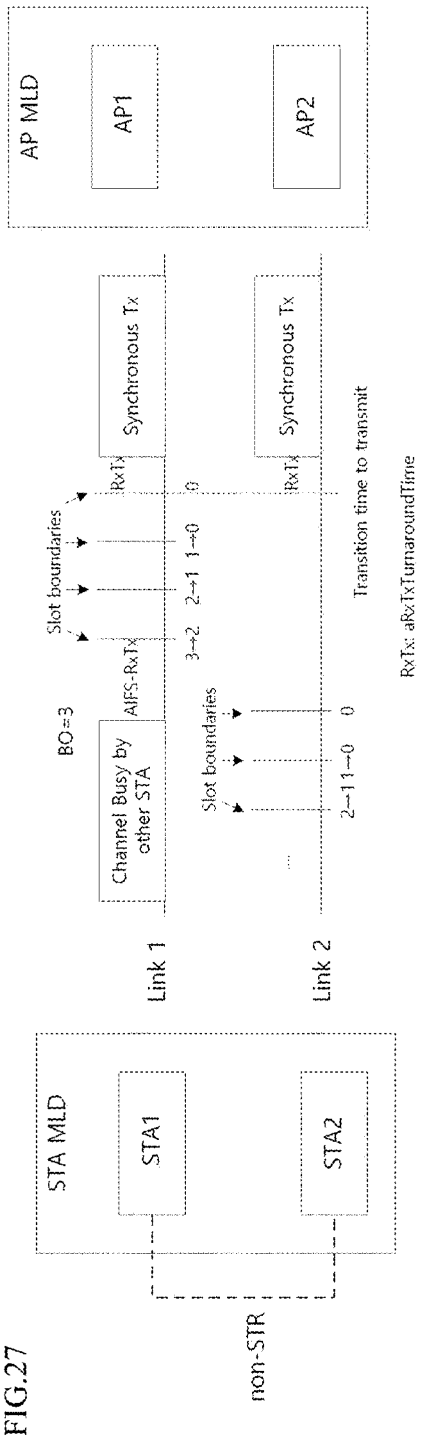
FIG. 27 shows a multi-link device performing an operation of performing synchronized transmission according to an EDCAF operation according to an embodiment of the present invention.
Figure 28:
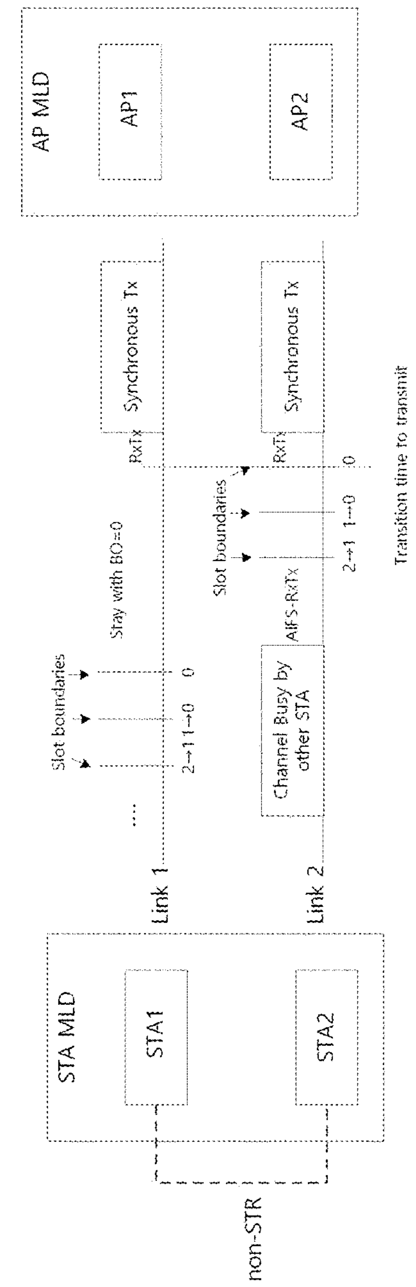
FIG. 28 shows a multi-link device performing an operation of performing synchronized transmission according to an EDCAF operation according to an embodiment of the present invention.

FIG. 27 and FIG. 28 show a multi-link device performing an operation of performing synchronized transmission according to an EDCAF operation according to an embodiment of the present invention.

A time point at which a station is able to transmit a frame may be a time point at which the station has completed a channel access procedure in a link in which the station operates, according to an EDCA operation. When a backoff value is 0 at a slot boundary, the station may start synchronized transmission. A slot boundary at which a frame is able to be transmitted may be a slot boundary immediately after the backoff value becomes 0. When the station maintains the backoff value at 0 and delays frame transmission, an operation of transmitting a frame at a random slot boundary by the station may not be allowed. If a frame to be transmitted is generated while the backoff value is 0, a slot boundary immediately after the backoff value becomes 0 may be the first slot boundary after the frame is generated. If a backoff value randomly selected by a backoff procedure is already 0, a slot boundary immediately after the backoff value becomes 0 may be a slot boundary immediately after the backoff value is selected.

In addition, when transmission is delayed in one link, synchronized transmission may be performed at a slot boundary immediately after the backoff value becomes 0 in another link. Consequently, the station may perform synchronized transmission at the following time points.

1) A slot boundary time point immediately after the backoff value becomes 0 in a link in which the station operates
2) While the backoff value is already maintained at 0 and transmission is delayed in a link in which the station operates, a slot boundary time point immediately after the backoff value of another station of multiple links becomes 0 in another link Referring to a definition related to a slot boundary time point, a slot boundary immediately after the backoff value for transmitting a frame becomes 0 may imply that a CCA (channel state inspection) result indicates an idle (or not busy) state from a slot boundary when the backoff value becomes 0 to the next slot boundary.

In the embodiments of FIG. 27 and FIG. 28, the first station (STA 1) is connected to a first AP (AP 1) in the first link (link 1). The second station (STA 2) is connected to a second AP (AP) in the second link (link 2). In the embodiment of FIG. 28, the second station (STA 2) succeeds in a channel access first, and the second station (STA 2) delays transmission. When the first station (STA 1) succeeds in the channel access, the first station (STA 1) and the second station (STA 2) perform synchronized transmission. Specifically, the first station (STA 1) and the second station (STA 2) perform synchronized transmission at a next slot boundary after the backoff counter value of the first station (STA 1) becomes 0. Therefore, as actual transmission, synchronized transmission is started after a transceiver is switched to a transmission mode from a next slot boundary after the backoff counter value of the first station (STA 1) becomes 0.

In the embodiment of FIG. 28, the first station (STA 1) succeeds in a channel access first, and the first station (STA 1) delays transmission. When the second station (STA 2) succeeds in a channel access, the first station (STA 1) and the second station (STA 2) perform synchronized transmission. Specifically, the first station (STA 1) and the second station (STA 2) perform synchronized transmission at a next slot boundary after the backoff counter value of the second station (STA 2) becomes 0. Therefore, as actual transmission, synchronized transmission is started after a transceiver is switched to a transmission mode from a next slot boundary after the backoff counter value of the second station (STA 2) becomes 0.

The station may transmit a frame at a slot boundary time point at which the backoff value becomes 0. Therefore, synchronized transmission may be simplified.

Figure 29:
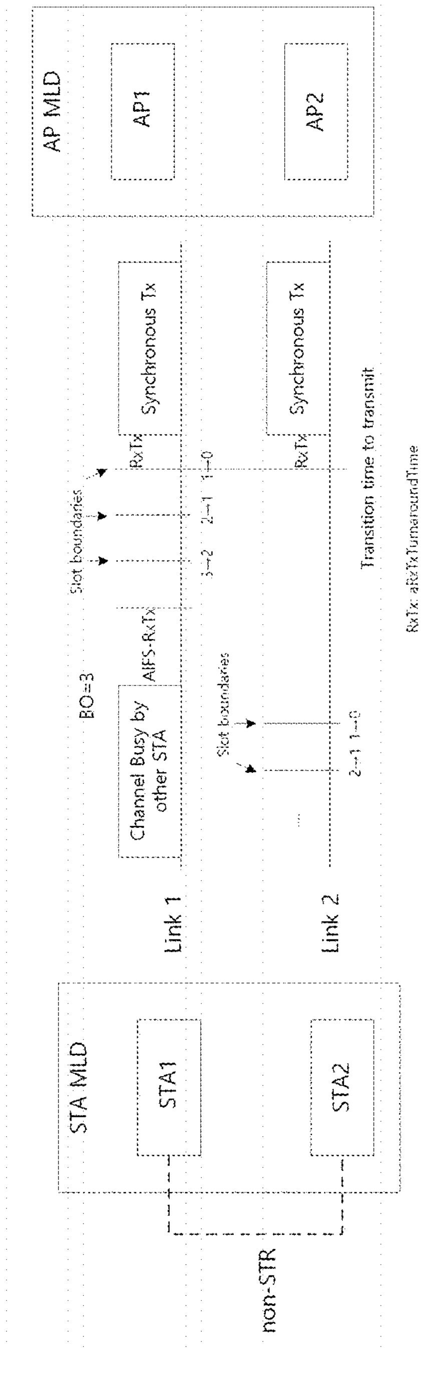
FIG. 29 shows a multi-link device performing an operation of performing synchronized transmission according to an EDCAF operation according to another embodiment of the present invention.

FIG. 29 shows a multi-link device performing an operation of performing synchronized transmission according to an EDCAF operation according to another embodiment of the present invention.

A slot boundary time point may be as follows.

Figure 30:
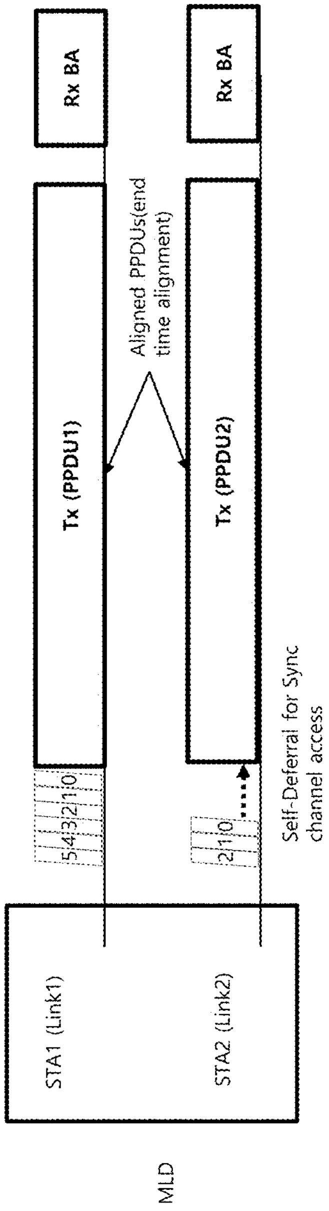
FIG. 30 illustrates an embodiment in which an MLD delays a channel access procedure of a particular channel, thereby simultaneously performing PPDU transmission in two links according to an embodiment of the present invention.

1) In a case where a channel occupation situation is generated by a frame transmitted by another station and a frame reception error situation has not occurred, if a channel state is in a channel idle state for a time of (AIFSN[AC]+1)*aSlotTime−aRxTxTurnaroundTime after passage of an SIFS time from a time point at which a corresponding occupation time is completed, a time point when the time has passed 2) In a case where a channel occupation situation is generated by a frame transmitted by another terminal and a frame reception error situation occurs, if a channel state is in a channel idle state for a time of {EIFS−DIFS+(AIFSN[AC]+1)*aSlotTime+aSIFSTime−aRxTxTurnaroundTime} from a time point at which a channel occupation state by physical detection is completed, a time point when the time has passed 3) After a frame requesting transmission of a response frame (e.g., ACK frame or BlockAck frame) is transmitted, the earlier time point among the following two time points A) If a channel state is in a channel idle state for a time of (AIFSN[AC]+1)*aSlotTime+aSIFSTime−aRxTxTurnaroundTime after a reception expiration time point for reception of a response frame after a transmission end time point of a PPDU including a frame, a time point when the time of (AIFSN[AC]+1)*aSlotTime+aSIFSTime−aRxTxTurnaroundTime has passed B) In a case where a response frame is received, if a channel state is in a channel idle state for a time of (AIFSN[AC]+1)*SlotTime−aRxTxTurnaroundTime after passage of an SIFS time from a reception end time point of a PPDU including the response frame, a time point when the time of AIFSN[AC]+1)*aSlotTime−aRxTxTurnaroundTime has passed 4) If a channel state is in a channel idle state for a time of AIFSN[AC]*SlotTime−aRxTxTurnaroundTime after passage of an SIFS time from a transmission end time point of a PPDU including a frame not requesting transmission of a response frame, a time point when the time of AIFSN[AC]*aSlotTime−aRxTxTurnaroundTime has passed 5) If a channel state is in a channel idle state for a time of (AIFSN[AC]+1)*aSlotTime+aSIFSTime−aRxTxTurnaroundTime after a random channel occupation time not corresponding to conditions 1-4, a time point when the time of (AIFSN[AC]+1)*aSlotTime+aSIFSTime−aRxTxTurnaroundTime has passed 6) If a channel state is in a channel idle state for a time of aSlotTime from a previous slot boundary time point, a time point when aSlotTime has passed A time point at which the station is able to switch a transceiver to a transmission mode to transmit a frame in each link may be adjusted as follows:

1) A multi-link slot boundary time point at which the backoff value becomes 0 in a corresponding link 2) While the backoff value is already maintained at 0 and a frame transmission operation is deferred in a corresponding link, a multi-link slot boundary time point at which the backoff value becomes 0 in another link In the embodiment of FIG. 30, the first station (STA 1) is connected to a first AP (AP 1) in the first link (link 1). The second station (STA 2) is connected to a second AP (AP) in the second link (link 2). The second station (STA 2) succeeds in a channel access first, and the second station (STA 2) delays transmission. When the first station (STA 1) succeeds in a channel access, the first station (STA 1) and the second station (STA 2) perform synchronized transmission. Specifically, the first station (STA 1) and the second station (STA 2) perform synchronized transmission at a slot boundary when the backoff counter value of the first station (STA 1) becomes 0. Therefore, as actual transmission, synchronized transmission is started after a transceiver is switched to a transmission mode after a slot boundary when the backoff counter value of the first station (STA 1) becomes 0.

FIG. 30 illustrates an embodiment in which an MLD delays a channel access procedure of a particular channel, thereby simultaneously performing PPDU transmission in two links according to an embodiment of the present invention.

Referring to FIG. 30, in a case where an MLD including multiple links performs multi-transmission in the respective links, the MLD may adjust the values of backoff counters of the respective links to simultaneously perform multi-transmission.

Specifically, as illustrated in FIG. 30, the MLD may include STA 1 and STA 2. Links in which STA 1 and STA 2 are operated may be a link pair having a mutual non-STR relationship, and the MILD may be to perform simultaneous transmission by using the link pair having the non-STR relationship. In this case, even after completion of a channel access procedure of STA 2 (i.e., BO becomes 0 through a backoff procedure), the MILD may not start PPDU2 transmission by using STA 2, and select deferring transmission of PPDU2. A time point at which the channel access procedure is completed may indicate a slot boundary when BO becomes 0 in a case of using a DCF, and may indicate the next slot boundary of a slot boundary when BOO becomes 0 in a case of using an EDCA. During a transmission deferring interval of PPDU2, STA 1 that is the other STA of the MLD has completed a channel access procedure, and the MLD may start to simultaneously transmit PPDU1 and PPDU2 by using STA 1 having just finished the channel access procedure and STA 2 having been waiting (deferring transmission) after completing the channel access procedure. In the present invention, a PPDU may include a frame. In addition, an operation of transmitting or not transmitting a PPDU may include an operation of transmitting or not transmitting a frame.

That is, an EDCA rule of each link may allow channel access in all links, and to this end, even in a case where a channel access procedure is terminated in one link among multiple links of an MLD and thus the value of a backoff counter reaches "0", when a backoff counter value of another link has not reached "0", an STA of the MLD may not perform uplink transmission in the corresponding link and maintain the value of the backoff counter as 0. In other words, in a case where the value of a backoff counter reaches "0" in a particular link, when the value of a backoff counter in another link of an MLD has not reached "0", an STA of the MLD may select not performing uplink transmission and maintaining the value of the backoff counter as 0.

If, in FIG. 30, after the channel access procedure of STA 2 is completed, the backoff counter value reaches "0" and thus STA 2 immediately starts transmission of a PPDU, the channel access procedure of STA 1 may be interfered with (interrupted) by the PPDU transmission of STA 2. However, as described above, a transmission start time point of the PPDU is adjusted in a link of an STA having completed the channel access procedure among STA 1 and STA 2, the MLD may use a link pair having a non-STR relationship to simultaneously perform PPDU transmission.

Therefore, when the MLD has an intention to perform simultaneous transmission, even though a channel access procedure is completed, the STAs of the MLD may not immediately initiate PPDU transmission or not perform a new channel access procedure. In other words, the STAs of the MLD may perform an operation of maintaining BO at 0 after the channel access procedure is completed. However, the operation of maintaining, by a particular STA, BO at 0 after the channel access procedure is completed, as described above, may be restricted in a case where the particular STA is an STA of an MLD. A link in which the particular STA is operated may be limited to belong to a link pair having a non-STR relationship with another STA of the MLD. The operation of maintaining, by the particular STA, BO at 0 after the channel access procedure is completed may be allowed only when the MLD including the particular STA has an intention to perform simultaneous transmission (start time synchronous).

That is, in a case where the links for the STAs of the MILD are a link pair having a non-STR relationship, when the channel access procedures of the STAs are completed at different time points, the MILD may defer, based on a link in which the channel access procedure is lastly completed, PPDU transmission of the other links. For example, in a case where the first link of STA 1 included in the MLD and the second link of STA 2 are a non-STR link pair, the value of the first backoff counter in a backoff procedure by a channel access procedure of the first link of STA 1 may reach "0" earlier than the value of the second backoff counter in a backoff procedure by a channel access procedure of the second link of STA 2. In this case, STA 1 does not perform PPDU transmission in the first link, and selects continuous maintaining of "0" as the value of the backoff counter. <Mismatch between slot boundaries when simultaneous transmission is performed> As described above, an MLD may perform simultaneous transmission by using two or more links, and the wording "simultaneous" in the simultaneous transmission may not mean physically exactly the same time. More specifically, simultaneous transmission performed by an MLD may imply that start time points of transmission performed in two or more links have a difference within a particular time interval. For example, in a case where the particular time interval is aSlotTime, when an MLD has started PPDU transmission at a "t" time point in link 1 and has started transmission in link 2 which is a different link, "after t-aSlotTime and before t+aSlotTime", the MLD may be considered as having performed simultaneous transmission by using link 1 and link 2. Here, aSlotTime having been used as an example of the particular time interval is merely for an example, and a time interval that the MLD is required to consider/strictly observe to perform simultaneous transmission may be time values (1 μs, 2 μs, 3 μs, . . . , and x s, etc.) other than aSlotTime. The time interval required to be considered to perform simultaneous transmission may be a value indicated by an AP of a BSS. For example, an AP MLD may indicate, through an operating mode (OM) element, a time value required to be considered when STA MLDs associated with the AP MLD perform simultaneous transmission.

The aSlotTime described above indicates a time value defined in a standard for each PHY version, and if a corresponding slot is idle every aSlotTime, a channel access procedure of reducing a backoff (BO) counter by 1 is performed. The channel access procedure may be a DCF or an EDCA, and is a conventionally well-known channel access procedure of Wi-Fi, and thus a detailed description will be omitted. For example, in a case of 11ax, aSlotTime is 9 μs.

As described above, simultaneous transmission performed by an MILD does not mean only "simultaneously" started transmission in the strict sense, and means including transmission started with a difference within a particular time interval. This may be because slot boundaries of respective links used in simultaneous transmission are not aligned. A more detailed description relating to slot boundaries will be given with the embodiment of FIG. 31.

Figure 31:
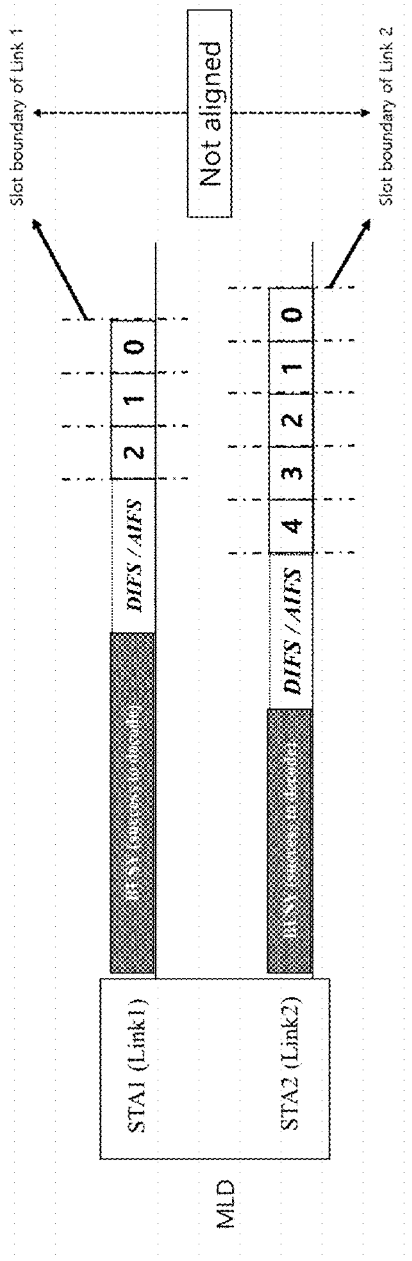
FIG. 31 illustrates an embodiment in which STAs of an MLD operate based on different slot boundaries according to an embodiment of the present invention.

FIG. 31 illustrates an embodiment in which STAs of an MLD operate based on different slot boundaries according to an embodiment of the present invention.

Referring to FIG. 31, different links of STAs configuring an MLD may operate with different slot boundaries.

Wi-Fi devices determine (calculate) a slot boundary, based on a time point when occupation of a primary channel thereof is ended in a case where the primary channel is occupied by another device. A slot boundary is used as a criterion for distinguishing between slots during a channel access procedure, and transmission performed by a Wi-Fi device after completing a channel access procedure is required to be performed at a time point matching a slot boundary.

Therefore, as illustrated in FIG. 31, when medium occupation is ended at different times in link 1 and link 2, STA 1 and STA 2 that are the STAs of the MLD are required to perform channel access procedures, based on different slot boundaries. As described above, STAs operated in different links have a high possibility of having different slot boundaries according to the occupation states of the links for operation thereof. Therefore, "simultaneous" starting, in the strict sense, of transmission in two or more links to be used for simultaneous transmission may be an impossible operation.

In addition, an MLD may attempt to start simultaneous transmission at a particular time point by using two or more links. However, the two or more links are processed via an MAC and a PHY which are separated from each other, and are transmitted after being configured by different PPDU BWs in different links. Therefore, processing for PPDU transmission at the perfectly same time point ("simultaneous" proper) may not be able to be completed. Therefore, even if an MILD attempts to perform simultaneous transmission ("simultaneous" transmission proper) while disregarding different slot boundaries of different links, the time points of starting transmission in the different links may be still different from each other.

Therefore, in order for multiple STAs configuring an MILD to perform simultaneous transmission through respective links, a rule relating to transmission start time points of transmissions performed in respective links is required. A rule required to be followed by an MILD for simultaneous transmission may be that a start time point of transmission of a particular link performed for simultaneous transmission is required to be started in an aRxTxTurnaroundTime interval (a time interval within aSlotTime) of another link performing simultaneous transmission. Alternatively, a rule required to be followed by an MLD for simultaneous transmission may be that a start time point of transmission of a particular link performed for simultaneous transmission is required to be positioned after a CCADel (or CCATime) interval within aSlotTime of another link performing simultaneous transmission. The aRxTxTurnaroundTime is a time (a time required to actually perform carrier sensing and PD for CCA within aSlotTime) required to perform PPDU transmission by a PHY having been performing a channel access procedure, and the time actually required by each device may be different according to implementation. aRxTxTurnaroundTime is mainly considered as 4 μs in the present invention, and specific values of the aRxTxTurnaroundTime may be changed. The CCATime may be understood as an interval in which each STA is required to perform CCA (CS) within aSlotTime, and the time interval may be determined according to implementation. CCADel is an interval value obtained by adjusting CCATime in consideration of delay, and may vary according to implementation.

That is, a slot configuration may vary for each link, and thus the boundaries of slots between links may not match each other. Therefore, the boundaries of slots between links may not match each other in relation to respective slots, the backoff counter of which decreases, and when all backoff counters of backoff procedures have reached "0" through a deferring operation described above in multiple links of the MILD, respectively, slot boundaries of respective links may not match each other. Slots of respective links may be individually configured, and thus slot boundaries of respective links may not match each other. Therefore, even when the values of backoff counters in respective links are all "0", slot boundaries may be different from each other. In this case, simultaneous transmission may be performed according to a slot boundary of a slot in which a backoff counter value of a particular link among multiple links is "0" or a slot next to the slot. That is, in a case where a link serving as a criterion for multi-transmission among multiple links of a non-AP MLD is a particular link, when a backoff counter value is reduced to "0" in slot 1 of the particular link, the other links may perform uplink transmission, based on the slot boundary of slot 1 of the particular link or slot 2 that is next to the slot 1 on the time axis.

That is, respective links do not perform uplink transmission according to slot boundaries of the links, and may defer or advance uplink transmission according to a slot boundary of a particular link so as to simultaneously perform the uplink transmission.

For example, if multiple links of an MLD are configured by a first link and a second link, and a channel access procedure is ended in one link among the first link and the second link (e.g., one backoff counter among a first backoff counter of the first link and a second backoff counter of the second link has reached "0" earlier than the remaining backoff counter), the slot boundaries of the first link and the second link for uplink transmission may not match each other at a time point when a channel access procedure of the other link is ended (when the remaining backoff counter reaches "0"). In this case, uplink transmission in each link is performed according to a slot boundary of a particular link, among the first link and the second link, for simultaneous uplink transmission, whereby uplink transmission may be simultaneously performed in multiple links.

That is, if multiple links of an MILD are configured by a first link and a second link, and one backoff counter among a first backoff counter of the first link and a second backoff counter of the second link has reached "0" earlier than the remaining backoff counter, the slot boundaries of the first link and the second link for uplink transmission may not match each other when the remaining backoff counter reaches "0". In this case, a transmission time point of uplink transmission in the second link may be adjusted by being advanced or delayed according to the slot boundary of the slot in which the first backoff counter of the first link is "0", or the slot boundary of a first slot which is next to the slot.

An uplink transmission time point in the first link and an uplink transmission time point in the second link may be within a particular time. For example, the uplink transmission time point in the second link may be positioned within 4 s from the uplink transmission time point in the first link.

Through the method described above, uplink transmission is performed at a different time point rather than the slot boundary of the slot in which the second backoff counter of the second link is "0" or the slot boundary of a second slot which is next to the slot, thereby uplink transmission may be simultaneously performed in the first link and the second link.

An STA, transmission of which is delayed according to a slot boundary, among STAs included in an MLD may continue channel sensing of a corresponding slot in a link for a delayed time, and when the backoff counter value becomes "0" in another link during the channel sensing, the STA may terminate the channel sensing and immediately transmit a PPDU. A time delayed or advanced for simultaneous transmission may be 4 μs. 4 μs may indicate a change time required to switch to a mode for performing uplink transmission from a channel access procedure. If the delayed or advanced time exceeds 4 μs, the time exceeds a time taken to switch from downlink to uplink, and thus a channel state in a corresponding slot may be changed to a busy state.

Figure 33:
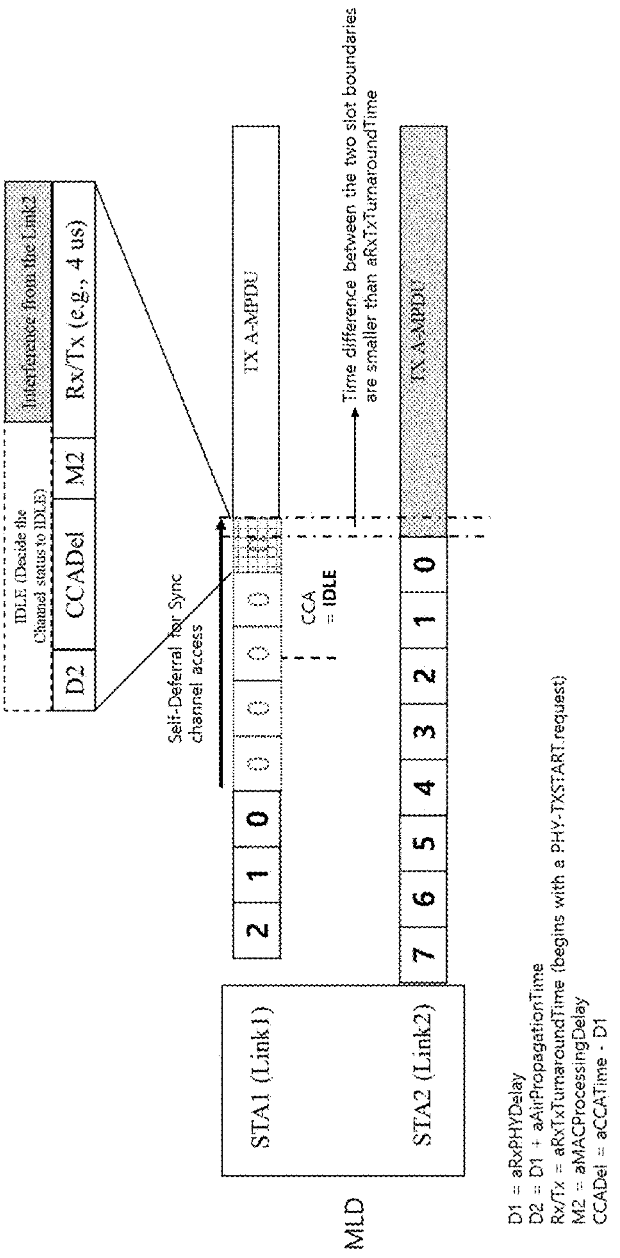
FIG. 33 illustrates an embodiment of a case where, when STAs of an MILD start transmission at different slot boundaries, earlier started transmission does not affect a CCA result of another STA (in the same MILD operated in a different link) according to an embodiment of the present invention.

An STA operation in aSlotTime illustrated in FIG. 33 is for an example, and an operation performed by each STA within aSlotTime corresponding to every slot may vary. However, all Wi-Fi devices may be required to satisfy a carrier sensing (CS) accuracy level defined in a Wi-Fi standard when same are implemented.

Figure 32:
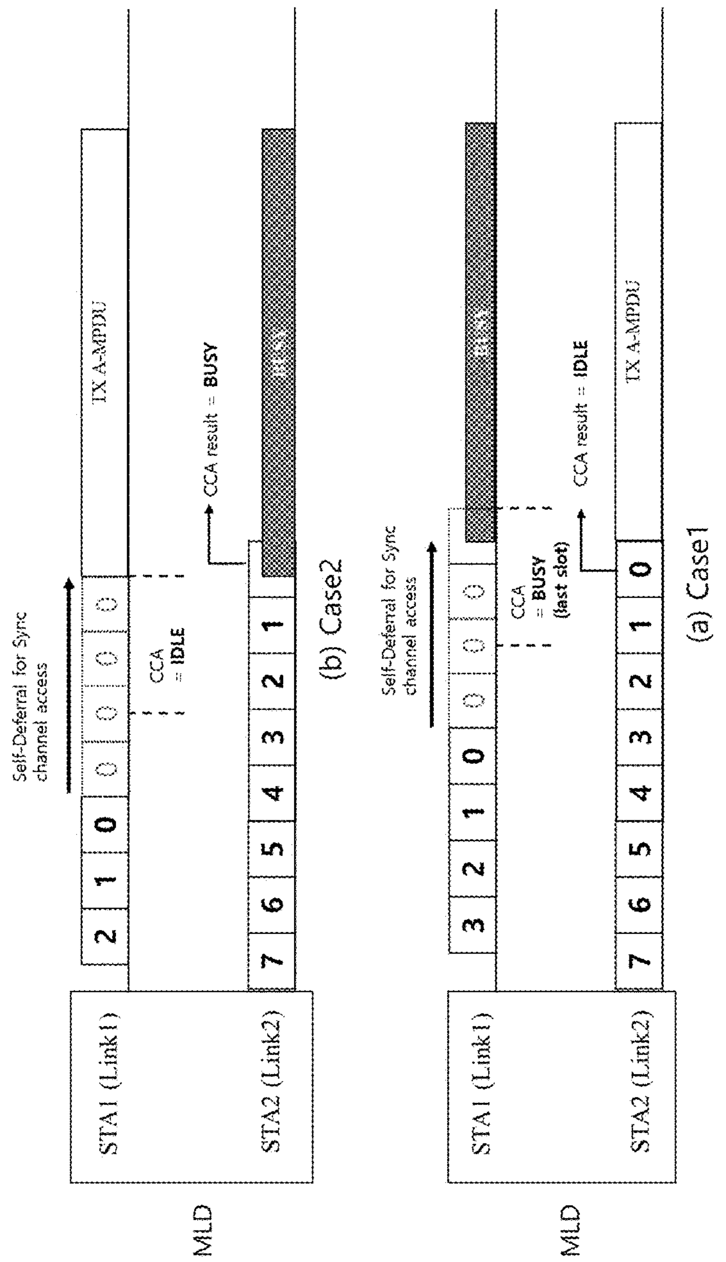
FIG. 32 illustrates embodiments of simultaneous transmission failure of an MLD which may occur when there is no clear rule for a start time point of simultaneous transmission according to an embodiment of the present invention.

FIGS. 32A and 32B illustrates embodiments of simultaneous transmission failure of an MLD which may occur when there is no clear rule for a start time point of simultaneous transmission according to an embodiment of the present invention.

Referring to FIGS. 32A and 32B, in FIGS. 32A and 32B, even though a channel access procedure of STA 1 is completed, an MILD delays starting of STA 1 transmission to perform simultaneous transmission using STA 1 and STA 2.

The slot boundaries between STA 1 and STA 2 are different from each other, and thus the MLD is to cause a transmission start time point of STA 1 having been delaying the channel access procedure to match a time point similar to a time point at which STA 2 completes a channel access procedure. The MLD may cause the transmission start time point of STA 1 to match a slot boundary of STA 1 adjacent to a slot boundary (the boundary of a slot used by STA 2) when STA 2 completes the channel access procedure. In this case, a start time point of transmission started by STA 1 may be an STA 1 slot boundary existing immediately after a time point (a particular slot boundary of STA 2) at which STA 2 completes a channel access as illustrated in case 1 (*a*) of FIG. 14. Alternatively, a start time point of transmission started by STA 1 may be a slot boundary of STA 1 existing immediately before a time point (a particular slot boundary of STA 2) at which STA 2 is predicted to complete a channel access as illustrated in case 2 (*b*) of FIG. 14. In summary, in a case where the MLD is to perform simultaneous transmission by using two or more links, the MLD may attempt to start transmission at slot boundaries of respective links adjacent to a slot boundary of a link in which a channel access procedure is completed lastly (a slot boundary of an STA operated in the link) among the two or more links.

However, as described above, the slot boundaries of respective links may be different from each other. Therefore, when transmission is started in a particular link to be used for simultaneous transmission, the transmission may affect a CCA operation of another link required to be used for simultaneous transmission, and consequently, starting of transmission in the other link may be impossible. More specifically, transmission started in the particular link incurs in-device interference, and thus a CCA result of the other link may be determined to indicate BUSY due to the in-device interference. Therefore, the STA of the other link may operate after recognizing that a WM has already been occupied and a channel access is restricted. Consequently, transmission of a particular link started for simultaneous transmission incurs in-device interference to another link having been planning on transmission for simultaneous transmission, thereby restricting channel access of the other link. As illustrated in (a) and (b) of FIG. 14, whichever slot boundary STA 1 having completed a channel access procedure and then having been delaying a transmission start time point selects and performs transmission thereat among two slot boundaries (an STA 1 slot boundary immediately after a slot boundary at which STA 2 completes a channel access procedure, and an STA 1 slot boundary immediately before a slot boundary at which STA 2 is predicted to complete the channel access procedure) adjacent to a slot boundary of STA 2 having just completed a channel access or predicted to complete same, earlier started transmission affects a CCA result of another link and simultaneous transmission may fail.

Therefore, a transmission start time point of a link having completed a channel access procedure and then having been delaying/deferring starting of transmission to perform simultaneous transmission is not able to be specified as one of two slot boundaries (slot boundaries of the particular STA) adjacent to a time point (a slot boundary of another STA) at which an STA of another link to perform simultaneous transmission completes a channel access procedure or is predicted to complete same. Furthermore, an MLD has to determine the transmission start time point every simultaneous transmission attempt in consideration of the difference between slot boundaries of the particular link and the other link.

As described above, a transmission start time point of a link having completed a channel access procedure and then having been delaying/deferring transmission to perform simultaneous transmission should not be specified as a slot boundary (of the link having been delaying transmission) immediately before or immediately after a slot boundary of a link in which a channel access procedure is ended lastly among channel access procedures of respective links performing simultaneous transmission. Furthermore, even if two or more links to perform simultaneous transmission start respective transmission, the links are required to be managed so that mutual transmission does not affect a CCA result of the other link. Therefore, in order to prevent transmission started in each link from affecting a CCA result of another link to perform simultaneous transmission, a transmission start time point of each link is required to be determined by considering a CCA operation performed by the other links for each slot interval (aSlotTime). A transmission start time point of a particular link determined by considering a CCA operation of the other link may be a time point determined to be positioned within aRxTxTurnaroundTime taken for the other link to switch from Rx mode to Tx mode after performing CCA. In other words, an STA of a particular link performing simultaneous transmission may start transmission in the particular link according to an aRxTxTurnaroundTime interval of STAs having not started transmission yet among STAs of the other links to perform simultaneous transmission. Alternatively, the STA of the particular link may start transmission in the particular link after a Slot CCADel interval of each of the STAs having not started transmission yet.

FIG. 33 illustrates an embodiment of a case where, when STAs of an MILD start transmission at different slot boundaries, earlier started transmission does not affect a CCA result of another STA (in the same MILD operated in a different link) according to an embodiment of the present invention.

Referring to FIG. 33, an MLD operates STA 1 and STA 2 in link 1 and link 2, respectively. A channel access procedure of STA 1 has been completed, but may delay a transmission start time point of STA 1 to perform simultaneous transmission with STA 2. Even when STA 2 starts transmission at a slot boundary at which a channel access procedure is completed, an STA 1 slot (a slot marked with grids, a slot immediately before STA 1 starts transmission) including a transmission start time point of STA 2 corresponds to an interval of switching STA 1 from Rx mode to Tx mode, and thus the MLD may determine that the transmission of STA 2 will not affect a CCA result of STA 1. Therefore, the MLD may determine a transmission start time point of STA 1 having completed a channel access procedure and then having been delaying starting of transmission, to match a slot boundary of STA 1 after a slot boundary of STA 2 having started transmission after completing a channel access procedure.

The STA 1 slot boundary after the slot boundary of STA 2 may be an STA 1 slot boundary immediately after the slot boundary of STA 2. Referring to FIG. 15 again for more detailed description, STA 1 may perform an operation of switching from Rx mode to Tx mode for the last 4 μs of aSlotTime corresponding to a slot marked with grids, and may not determine the slot marked with grids as being busy even if in-device interference occurs during the switching interval. Therefore, due to existence of a start time point of transmission performed by STA 2 in aRxTxTurnaroundTime of STA 1, STA 1 may perform a channel access without having a problem caused by in-device interference even after STA 2 starts transmission first.

4 μs mentioned above is used as an example of a value corresponding to aRxTxTurnaroundTime, and the aRxTxTurnaroundTime may have different values according to each terminal due to a hardware characteristic of each terminal. Therefore, the difference between transmission start time points of respective links required to be considered by an MLD when performing simultaneous transmission may be applied as different time values according to the characteristics of the MLD or each STA of the MLD.

As described above, a transmission start time point of a link having started transmission first may be applied to be positioned in an interval after CCADel rather than being positioned in an aRxTxTurnaroundTime interval of another link. However, in the present embodiment, when an aRxTxTurnaroundTime interval is replaced with an interval after CCADel, the above descriptions may be understood in a similar way, and thus a detailed description will be omitted. For reference, in the embodiment of FIG. 15, an interval including an M2 interval illustrated before an Rx/Tx (e.g., 4 us) interval may be understood as an interval after CCADel.

Figure 34:
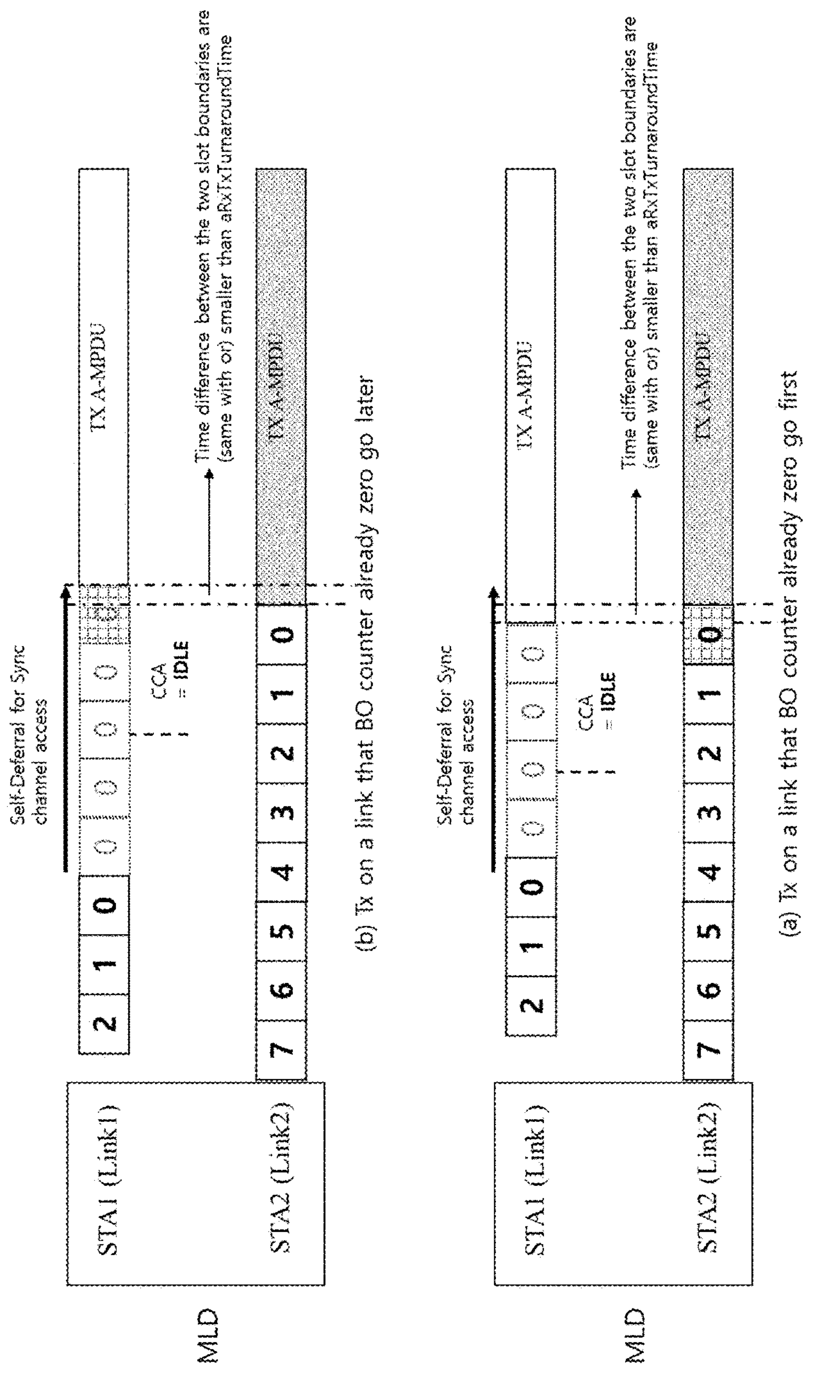
FIG. 34 illustrates embodiments of a method of determining a time point of starting transmission in each link according to a slot boundary time point difference between links in which an MLD is to perform simultaneous transmission according to an embodiment of the present invention.

FIGS. 34A and 34B illustrate embodiments of a method of determining a time point of starting transmission in each link according to a slot boundary time point difference between links in which an MILD is to perform simultaneous transmission according to an embodiment of the present invention.

FIG. 34A illustrates a situation where every slot boundary of STA 1 precedes (is earlier in time) every slot boundary of STA 2 by an interval smaller than aRxTxTurnaroundTime, and FIG. 34B illustrates a situation where every slot boundary of STA 2 precedes every slot boundary of STA 1 by an interval smaller than aRxTxTurnaroundTime. A method of comparing a slot boundary precedence relationship between the two links (STAs) may be comparing a precedence relationship between slot boundaries having a difference of ½ aSlotTime or smaller among the slot boundaries of the two links.

In a case of FIG. 34A, every slot boundary of STA 1 precedes every slot boundary of STA 2. Even if STA 1 starts transmission at its own slot boundary, the slot boundary of STA 1 is a time point corresponding to aRxTxTurnaroundTime in a grid-patterned slot interval (aSlotTime) of STA 2, the MILD may start transmission of link 1 at a slot boundary of STA 1 and then perform transmission of link 2 at a slot boundary of STA 2.

In a case of FIG. 34B, every slot boundary of STA 2 precedes every slot boundary of STA 1. Even if STA 2 starts transmission at its own slot boundary, the slot boundary of STA 2 is a time point corresponding to aRxTxTurnaroundTime in a grid-patterned slot interval (aSlotTime) of STA 1, the MILD may start transmission of link 2 at a slot boundary of STA 2 and then perform transmission of link 1 at a slot boundary of STA 1.

Consequently, when slot boundaries (or STAs operated in respective links) of respective links to perform simultaneous transmission have a time difference of aRxTxTurnaroundTime or smaller, the MLD may first start transmission via an STA operated in a link having the foremost slot boundary so as to perform simultaneous transmission. Even when the time difference (aRxTxTurnaroundTime) serving as a criterion is applied as a termination time point of CCADel, the aRxTxTurnaroundTime is merely changed to M2 (see FIG. 33)+aRxTxTurnaroundTime and understanding in the same way may be possible, and thus a detailed description will be omitted.

As described above, an MLD determines a link to start transmission first in consideration of the slot boundary difference between links to perform simultaneous transmission, so that in-device interference incurred by the link having started transmission first does not affect CCA of another link. However, if the slot boundary difference between links to perform simultaneous transmission is within a particular value, the MILD is unable to stop a channel access of another link from being interrupted regardless of the order in which transmission is initiated in the respective links. The difference within the particular value may indicate a difference greater than 4 s (or inclusive) and equal to or smaller than 4.5 s (or exclusive) when aSlotTime is 9 s and aRxTxTurnaroundTime is 4 μs. In other words, if the slot boundary difference between two links to be used by an MILD for simultaneous transmission is greater than 4 s (or inclusive) and equal to or smaller than 4.5 s (or exclusive), whichever link through which the MILD starts transmission first among the two links, channel access (simultaneous transmission) in the other link may be restricted due to in-device interference incurred by the link having started transmission first.

Figure 35:
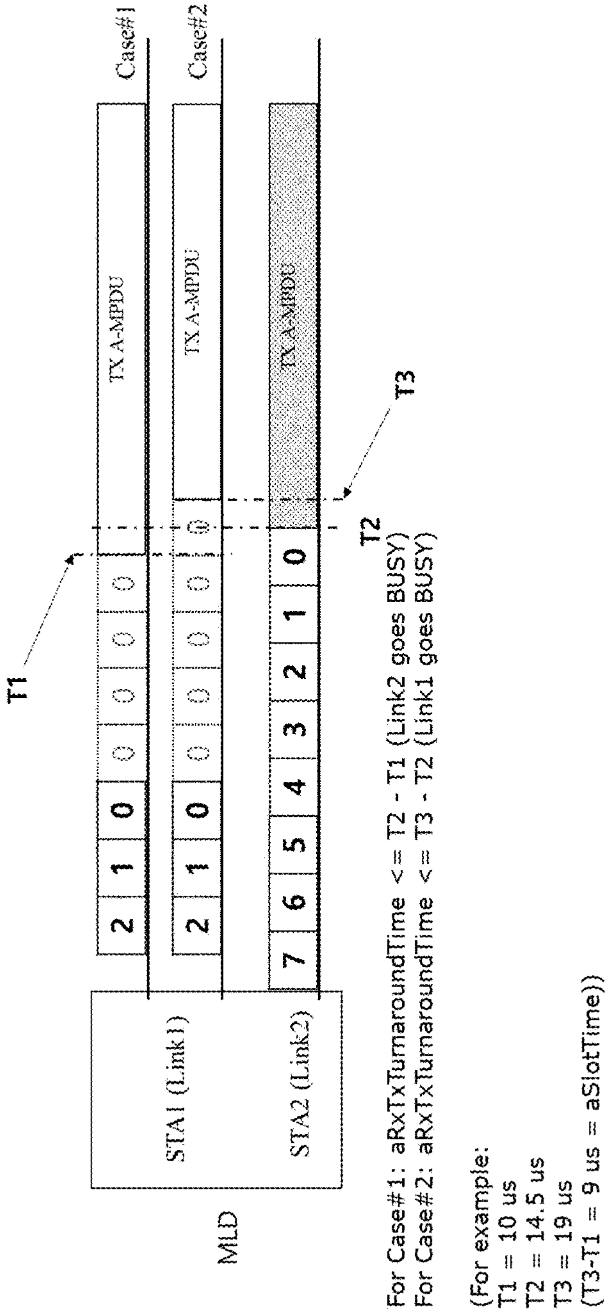
FIG. 35 illustrates an embodiment of a case where simultaneous transmission fails when a pair of two links of an MILD have a slot boundary difference within a particular range according to an embodiment of the present invention.

FIG. 35 illustrates an embodiment of a case where simultaneous transmission fails when a pair of two links of an MILD have a slot boundary difference within a particular range according to an embodiment of the present invention.

Referring to FIG. 35, an MILD may operate STA 1 and STA 2 in link 1 and link 2, respectively, and STA 1 and STA 2 may perform channel access, based on slot boundaries which are different by ½ aSlotTime. STA 1 has completed a channel access procedure first, and the MLD may defer starting of transmission of STA 1 to perform simultaneous transmission by using STA 1 and STA 2. In this case, the MLD may attempt to start transmission of link 1 at a slot boundary of STA 1 adjacent to a slot boundary at which a channel access of STA 2 is ended, but simultaneous transmission may fail due to the slot boundary difference between STA 1 and STA 2.

The MLD may select one of two boundaries of STA 1 adjacent to the slot boundary (T2 in FIG. 35) at which STA 2 completes/is predicted to complete a channel access procedure, and attempt to start transmission in link 1. If the MLD starts transmission in link 1 at a slot boundary (T1 in FIG. 35) of STA 1 present before a predicted channel access procedure completion time point of STA 2, the last backoff slot (marked with 0) of STA 2 may be determined as BUSY due to transmission started in link 1, and thus the channel access procedure of STA 2 is unable to be completed at a predicted T2 time point. That is, if the MLD starts transmission at a T1 time point by using STA 1, in-device interference incurred by transmission of link 1 causes failure of completion of the channel access procedure of STA 2, and simultaneous transmission fails. If the MLD attempts to perform transmission in link 1 at a slot boundary (T3 of FIG. 35) of STA 1 present after completion of a channel access procedure of STA 2, transmission of link 2 having already started at T2 causes the last slot of link 1 completed at T3 to be determined as BUSY, and thus a channel access on link 1 may be impossible. This may be because the time differences between T1 and T2 and between T2 and T3 are greater than aRxTxTurnaroundTime, and thus whichever link in which transmission is initiated first among two links including link 1 and link 2, this results in interference with a channel access procedure of the other link.

As described above, when particular links have a slot boundary difference within a particular range, it may be impossible for the links to participate in simultaneous transmission in a method of starting transmission at their own slot boundaries. As in the embodiment of FIG. 35 described above, if a situation where aSlotTime is 9 s and aRxTx-TurnaroundTime is 4 s is assumed, a probability that a particular link pair have a slot boundary difference making simultaneous transmission impossible may be understood as 1/9 through a simple calculation. This probability may be somewhat high in consideration of that a non-STR MLD will actively try simultaneous transmission even for a purpose of preventing a particular link from being switched to a blind state.

In addition, some devices have a relatively short aRxTx-TurnaroundTime, and when simultaneous transmission is performed using such devices with a relatively short aRxTx-TurnaroundTime, a probability of restricting simultaneous transmission caused by a slot boundary difference of a particular link pair may become higher. For example, in a case where STAs of a particular MILD require only 1.5 s as aRxTxTurnaroundTime and have a characteristic of being able to CCA for the remaining time, when simultaneous transmission is performed using two links, the particular MILD may fail access to one channel among two links at a probability of (4.5-1.5)/9=1/3.

<Channel Access not Matching Slot Boundary>

As described above, in order to prevent occurrence of a problem of simultaneous transmission (simultaneous channel access) being restricted due to a slot boundary difference, while an MLD is deferring starting of transmission of a particular STA to perform simultaneous transmission (the particular STA has completed a backoff procedure (channel access procedure) (BO==0)), transmission started by the particular STA may be allowed to have an error of a predetermined level or lower from a slot boundary of the particular STA. In other words, when an MILD performs simultaneous transmission through multiple links, respective channel access procedures of a non-STR link pair that is a link pair in non-STR of the MLD may be ended at different time points. In this case, an STA of a link in which a backoff counter value has reached "0" first by a backoff procedure of each of the links of the non-STR link pair may maintain "0" as the backoff counter value and not transmit a PPDU until a backoff counter value reaches "0" in a link of another STA. In this case, when all the backoff counter values of the STAs which are the non-STR link pair of the MLD reaches "0", the slot boundaries of the STAs may not match each other. Therefore, the STAs of the MLD may start transmission at a different time point rather than their own slot boundaries. The error of the predetermined level or lower may be determined by considering aSlotTime. For example, the error of the predetermined level or lower may not exceed 10% of aSlotTime. If aSlotTime is 9 us, transmission performed by the STA of the MLD may be started within +−0.9 μs from the STA's own slot boundary. The reason why aSlotTime is considered at the time of determination of a range (error) allowing starting of transmission at a time point different from a slot boundary may be to prevent an error causing damage to slot boundary synchronization (Sync.) between STAs operated in particular links. The slot boundary synchronization may indicate synchronization allowing a channel access to be performed by an EDCA rule when a channel access procedure is performed using each slot boundary even though respective STAs use slightly different slot boundaries due to propagation delay.

That is, the error of the predetermined level or lower may not exceed 10% of (aSlotTime−aAirPropagationTime). The aAirPropagationTime may be a value (a unit of us) calculated as two times of a signal propagation time between the farthest away STAs (slot-synchronized), or a value indicated by a coverage class field parameter of a BSS. For example, when aAirPropagationTime of a BSS considered by an EHT AP is 1 s or smaller, a start time point of transmission performed by STAs of the BSS may be allowed to have an error of a maximum of 0.8 μs (+−10%*(9 μs−1 s)) from a slot boundary. In other words, an EHT STA may have to allow its transmission start time point to have a difference of 0.8 μs or smaller from a slot boundary.

That is, there is an error of "transmission start time point—slot boundary" allowable in consideration of a aSlotTime length used by a BSS and slot boundary synchronization stability (integrity) between STAs, and the error of the predetermined level or lower may be determined (secured) by considering the error. Simply put, an STA of an MLD may start transmission at a time point different from a slot boundary (within an error range) by using an error between a slot boundary and a transmission start time point allowed from slot boundary sync stability between STAs of particular links.

Alternatively, the error of the predetermined level or lower may be a value which is already determined (promised) regardless of aSlotTime, or a value indicated by an AP MLD. If a particular STA of an MLD having completed a channel access procedure and having been deferring transmission is allowed to start transmission regardless of the slot boundary of the STA, an allowed error level related to a slot boundary may be understood as aSlotTime/2.

Figure 36:
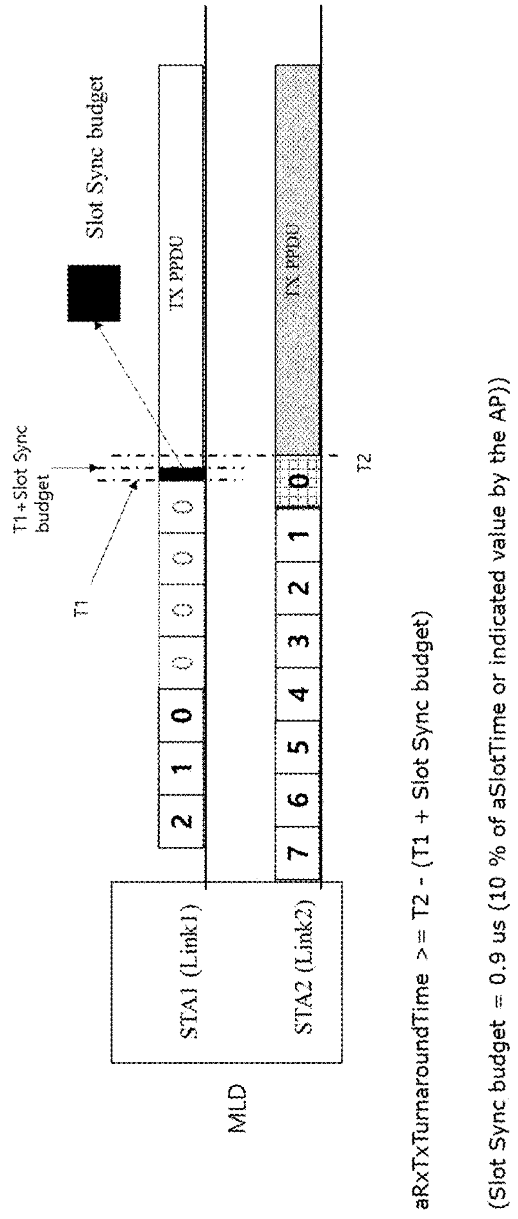
FIG. 36 illustrates an embodiment of a simultaneous transmission scheme performed by initiating, by an STA of an MLD having completed a channel access procedure and having been deferring starting of transmission, transmission at a time point different from a slot boundary of the STA according to an embodiment of the present invention.

FIG. 36 illustrates an embodiment of a simultaneous transmission scheme performed by initiating, by an STA of an MLD having completed a channel access procedure and having been deferring starting transmission, transmission at a time point different from a slot boundary of the STA according to an embodiment of the present invention.

Referring to FIG. 36, an MLD may operate STA 1 and STA 2 in link 1 and link 2, respectively, and STA 1 and STA 2 may perform channel access, based on slot boundaries which are different by ½ aSlotTime. STA 1 has completed a channel access procedure first, and the MLD may defer starting of transmission of STA 1 to perform simultaneous transmission by using STA 1 and STA 2. This is the same situation as that considered in FIG. 17, and in a case where transmission in link 1 is started at a slot boundary of STA 1 that is an STA of an MLD, simultaneous transmission (simultaneous channel access) is impossible using STA 1 and STA 2. However, STA 1 has completed a channel access procedure and then has been deferring starting of transmission to perform simultaneous transmission, and thus may freely adjust a transmission start time point within a predetermined (allowed) error from the STA 1's slot boundary.

Therefore, STA 1 does not start transmission at T1, which is one among its slot boundaries, and may start PPDU transmission at a time point delayed by an allowed error time (from T1). As a result, when STA 2 operated in link 2 assesses a slot (grid-pattern) adjacent to T2 which is a slot boundary at which a channel access procedure is ended, STA 2 may determine the slot as IDLE regardless of in-device interference incurred by transmission performed by STA 1, and start simultaneous transmission at T2. In summary, if transmission of STA 1 started at T1 matching its own slot boundary, a channel access procedure of STA 2 could have failed at T2 and thus simultaneous transmission could have failed. However, STA 1 has deferred a transmission start time point by a slot sync budget, and thus has started transmission of link 1 in an aRxTxTurnaroundTime interval of STA 2.

As described above, when a particular STA of MILD is operated to perform simultaneous transmission, the particular STA may be allowed to start transmission at a time point (but within an allowed error range) different from a slot boundary sync having been used for a channel access procedure of the particular STA, and as a result, the MILD may manage a transmission start time point of each link regardless of difference between the slot boundaries of respective links to be used for simultaneous transmission, so as to perform simultaneous transmission.

Figure 37:
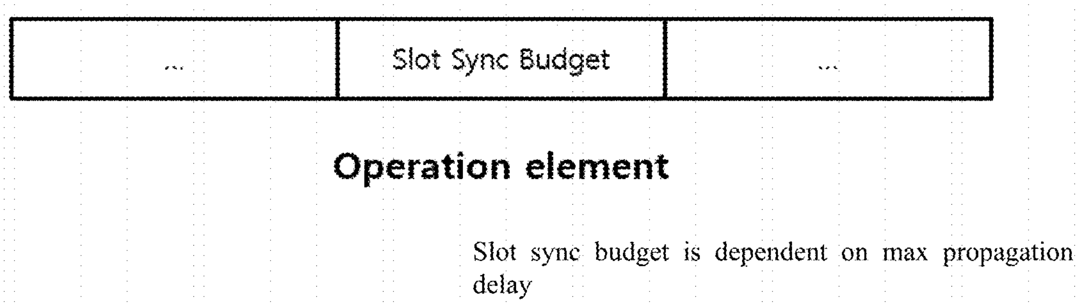
FIG. 37 illustrates an embodiment of signaling which may be used when an AP MLD indicates a slot sync budget available in a BSS with an operation element according to an embodiment of the present invention.

FIG. 37 illustrates an embodiment of signaling which may be used when an AP MLD indicates a slot sync budget available in a BSS with an operation element according to an embodiment of the present invention.

An AP MLD may assess integrity of slot boundary sync between STAs in a BSS to determine and indicate a slot sync budget which an STA MLD in the BSS is able to use to perform simultaneous transmission. The slot sync budget may be indicated through an operation element. The name of the field and an indicated element may be freely changed. A value indicated through the slot sync budget may be applied as a maximum error which may be provided between a transmission start time point of each link and a slot boundary of a corresponding link when an STA MLD performs simultaneous transmission. The slot sync budget is not limited to the purpose for simultaneous transmission, and may be applied as a time point error which may be provided between transmission performed by an EHT STA and a slot boundary.

For example, in a case where slot boundary sync between STAs in a BSS is solid (synchronization has been well done), an AP MLD may indicate a relatively large value through a slot sync budget field of an operation element, compared to a case where slot boundary sync between the STAs in the BSS is weak (synchronization has not been well done, or the slot boundary difference between the STAs is predicted/accessed as being large). The value indicated by the slot sync budget field may be used to identify an allowable error between a slot boundary and a time point at which each STA starts transmission. When simultaneous transmission is performed, STA MLDs of a BSS is required to perform same such that a time point of starting transmission in each link and a slot boundary used by a corresponding STA MLD to perform a channel access procedure have a time difference therebetween not exceeding an allowable error range identified based on the value indicated by the slot sync budget field.

<Simultaneous Transmission Method Considering Inter-Link Information Exchange Delay>

The above simultaneous transmission operations are based on an assumption that information related to the progress of a channel access procedure between multiple STAs included in an MILD may be shared closely. For example, a particular STA performing transmission at a time point at which another STA in an MILD completes a channel access procedure is an operation under the assumption that the particular STA is aware of a parameter (e.g., the remaining backoff counter number and a slot boundary) related to the channel access procedure of the other STA.

However, each STA of an MLD independently performs a channel access procedure basically in a link in which a corresponding STA is operated, and a method of sharing information by STAs may not be defined. Therefore, even if STAs are in an MLD, whether the STAs are able to share a parameter related to each other's channel access procedure in real time may vary according to an implementation method. In addition, CCA performed for channel access by each STA every slot is information, the result of CCA of which is required to be updated every aSlotTime, and there is a possibility that different developers may have different opinions on whether corresponding data needs to be exchanged between each STA in the MLD at every moment.

That is, when a channel access procedure for simultaneous transmission is considered, it should be noted that each STA in an MILD may have a certain level of delay to acquire information about each other's channel access procedure.

A method of performing simultaneous transmission by each STA of an MILD may be performed by an STA having completed a backoff procedure and then having been deferring transmission, as considered in the above embodiments of the present invention, and may correspond to 1) starting transmission at a time point at which another STA in the MILD is predicted to complete a channel access procedure or 2) starting transmission after identifying that another STA in the MILD has completed a channel access procedure.

A simultaneous transmission operation corresponding to 1) can be described through above embodiments of the present invention and thus a detailed description will be omitted. A simultaneous transmission operation corresponding to 2) will be described in more detail.

According to an embodiment of the present invention, an MLD trying to perform simultaneous transmission may delay a channel access procedure of a particular STA even though the channel access procedure of the particular STA has been completed. The particular STA may identify that another STA of the MLD has completed a channel access procedure, and then initiate transmission. The other STA may defer starting of transmission for a particular time after completion of the channel access procedure by considering in-device information processing delay (inter-link information exchange delay) required until the particular STA obtains information indicating that the other STA has completed the channel access procedure. The particular time may be a value configured considering the in-device information processing delay. The unit of the particular time may be μs or a multiple of aSlotTime (1 aSlotTime or 2 aSlotTime).

Figure 38:
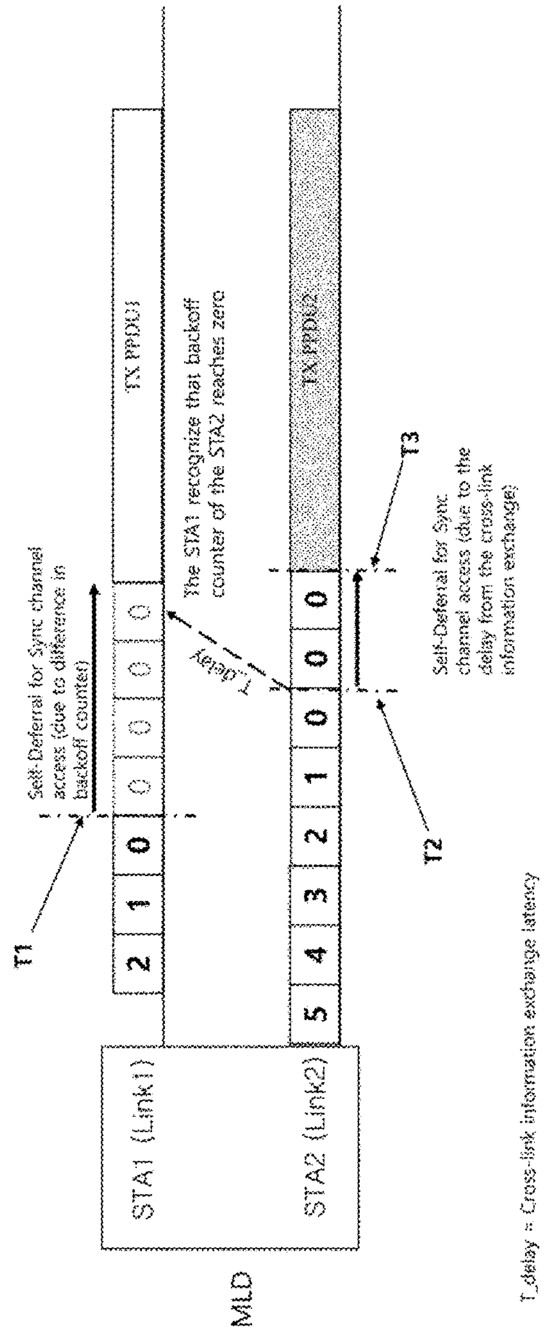
FIG. 38 illustrates an example of a simultaneous transmission procedure considering inter-link information exchange delay according to an embodiment of the present invention.

FIG. 38 illustrates an example of a simultaneous transmission procedure considering inter-link information exchange delay according to an embodiment of the present invention.

Referring to FIG. 38, an MLD may be to perform simultaneous transmission using STA 1 and STA 2. Each of STA 1 and STA 2 performs an independent channel access procedure, and thus the channel access procedures of STA 1 and STA 2 may be ended at different times, respectively. Referring to FIG. 20, STA 1 has completed a channel access procedure at a T1 time point (BO==0), but may defer transmission of PPDU1 to perform simultaneous transmission with STA 2.

Thereafter, STA 2 completes a channel access procedure at a T2 time point, and STA 1 may not be able to recognize, at the T2 time point, that the STA 2 has completed the channel access procedure, due to inter-link information exchange delay. Therefore, STA 2 may not be waiting the channel access procedure of STA 1, but may defer its transmission until a T3 time point and then initiate transmission of PPDU2 by considering a delay time (T_delay) taken for information indicating that STA 2 has completed the channel access procedure, to be transferred to STA 1.

T3 may be a time point of a slot boundary present after passage of an inter-link information exchange delay time from a time point (T2) at which STA 2 has completed the channel access procedure. In other words, the time difference between T3 and T2 may be equal to or greater than the inter-link information exchange delay time. The time difference between T3 and T2 may be equal to or smaller than (inter-link information exchange delay time+aSlotTime).

Thereafter, STA 1 receives the information indicating that STA 2 has completed the channel access procedure, and then may start transmission of PPDU1 at a slot boundary of STA 1 adjacent to T3. The slot boundary of STA 1 adjacent to T3 may be the first slot boundary existing after T3. Alternatively, STA 1 receives the information indicating that STA 2 has completed the channel access procedure, and then may start transmission of PPDU1 at T3.

Consequently, STA 1 and STA 2 performing simultaneous transmission may not immediately perform transmission even if their channel access procedures are all completed. An STA having completed a channel access procedure first may defer its transmission until identifying (through inter-link information exchange) that another STA has completed a channel access procedure, and an STA having completed a channel access procedure later may defer its transmission by considering a delay time required until another STA having been deferring transmission until the STA completes the channel access procedure obtains information that the STA has completed the channel access procedure.

Even when simultaneous transmission considering inter-link information exchange delay is performed, it is necessary to perform an operation considering a slot boundary time point difference between links performing simultaneous transmission, as considered in the above embodiments of the present invention. That is, in performing simultaneous transmission considering inter-link information exchange delay, there is still a possibility that transmission started in a particular link may interrupt a channel access procedure of another link. Therefore, even when an MLD performing simultaneous transmission performs simultaneous transmission considering inter-link information exchange delay, the MLD is still required to follow a method provided in the above embodiments of the present invention to select a slot boundary.

However, when an MLD performing simultaneous transmission performs simultaneous transmission considering inter-link information exchange delay, it may be required that an STA having completed a channel access procedure first initiates transmission at its own slot boundary, and an STA having completed a channel access procedure later determines a slot boundary at which the STA is to initiate transmission. A method of determining the slot boundary is the same as that described in the embodiments of FIGS. 34A and 34B, and a detailed description will be omitted.

In addition, the same problem (a problem that a proper slot boundary is indeterminable) as that described with reference to FIG. 35 may also occur in simultaneous transmission considering in-device interference, and in this case, an STA having completed a channel access procedure later may be allowed to initiate transmission at a time point different from its own slot boundary. A limitation applied to the transmission initiated at the time point different from the slot boundary may be the same as that described with reference to an embodiment of FIG. 36.

Figure 39:
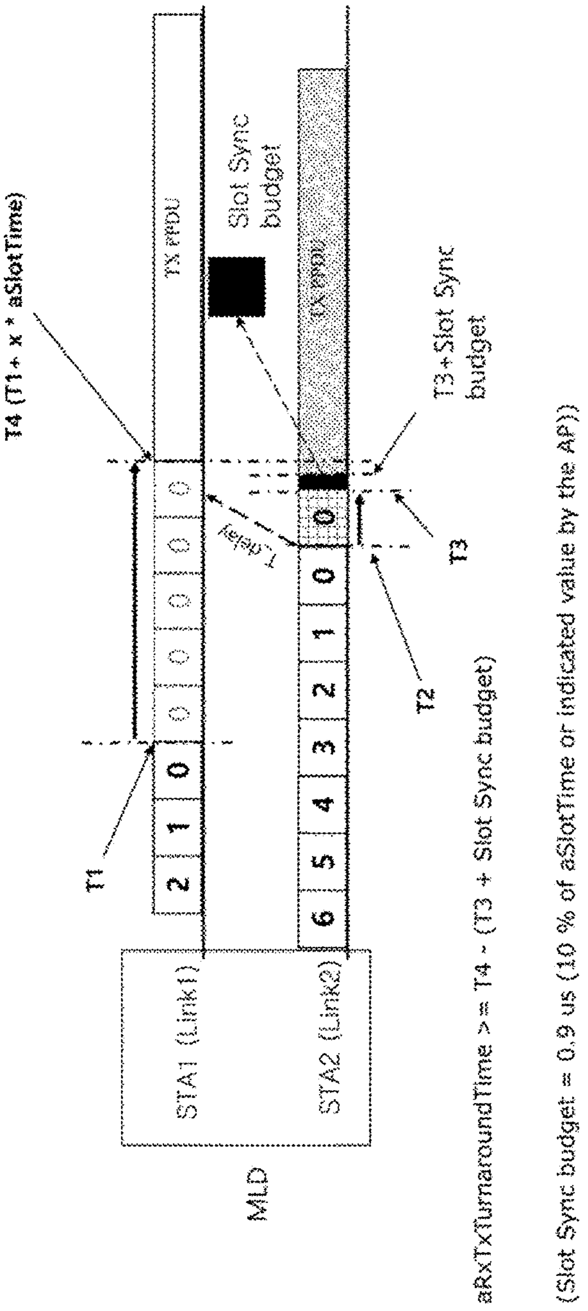
FIG. 39 illustrates an embodiment of a simultaneous transmission scheme in which an STA of an MLD having completed a channel access procedure and having been deferring starting of transmission recognizes that a channel access procedure of another STA has been completed, and then initiates transmission at a time point different from a slot boundary of the STA according to an embodiment of the present invention.

FIG. 39 illustrates a simultaneous transmission scheme in which an STA of an MLD having completed a channel access procedure and having been deferring starting of transmission recognizes that a channel access procedure of another STA has been completed, and then initiates transmission at a time point different from a slot boundary of the STA according to an embodiment of the present invention.

Referring to FIG. 39, an MLD may be to perform simultaneous transmission using STA 1 and STA 2. Each of STA 1 and STA 2 performs an independent channel access procedure, and thus the channel access procedures of STA 1 and STA 2 may be ended at different times, respectively. Referring to FIG. 20, STA 1 has completed a channel access procedure at a T1 time point (BO==0), but may defer transmission of PPDU1 to perform simultaneous transmission with STA 2.

Thereafter, STA 2 completes a channel access procedure at a T2 time point, and STA 1 may not be able to recognize, at the T2 time point, that the STA 2 has completed the channel access procedure, due to inter-link information exchange delay. Therefore, STA 2 may not be waiting the channel access procedure of STA 1, but may defer its transmission until a T3 time point and then initiate transmission of PPDU2 by considering a delay time (T_delay) taken for information indicating that STA 2 has completed the channel access procedure, to be transferred to STA 1.

T3 may be a time point of a slot boundary present after passage of an inter-link information exchange delay time from a time point (T2) at which STA 2 has completed the channel access procedure. In other words, the time difference between T3 and T2 may be equal to or greater than the inter-link information exchange delay time. The time difference between T3 and T2 may be equal to or smaller than (inter-link information exchange delay time+aSlotTime).

Thereafter, STA 1 receives the information indicating that STA 2 has completed the channel access procedure, and then may start transmission at a slot boundary (T4) of STA 1 (a corresponding link) existing after T3. STA 2 may recognize that STA 1 is to start transmission at a slot boundary corresponding to T4, by considering an inter-link information exchange delay time, and when STA 2 starts transmission at a slot boundary (T3+aSlotTime) existing after T3, STA 2 may recognize that the transmission initiated by STA 1 will interrupt transmission initiation of STA 2. In addition, when STA 2 starts transmission at the same slot boundary as T3 in time, STA 2 may recognize that STA 1 is unable to perform simultaneous transmission due to the transmission initiated by STA 2, and consequently, may recognize that the same slot boundary as T3 in time and the slot boundary existing after T3 are both unavailable as an initiation time point of simultaneous transmission.

In this case, STA 2 may start its own transmission at a time point different from its slot boundary within a range allowed by a slot sync budget. The meaning and use method of the slot sync budget have been described through other embodiments of the present invention described above, and thus a detailed description will be omitted.

Consequently, STA 2 may adjust a time point of initiating its transmission to a value of T3+slot sync budget to T4, so as to initiate its transmission at a time point at which STA 1 performs Rx/TxTurnaround.

Figure 40:
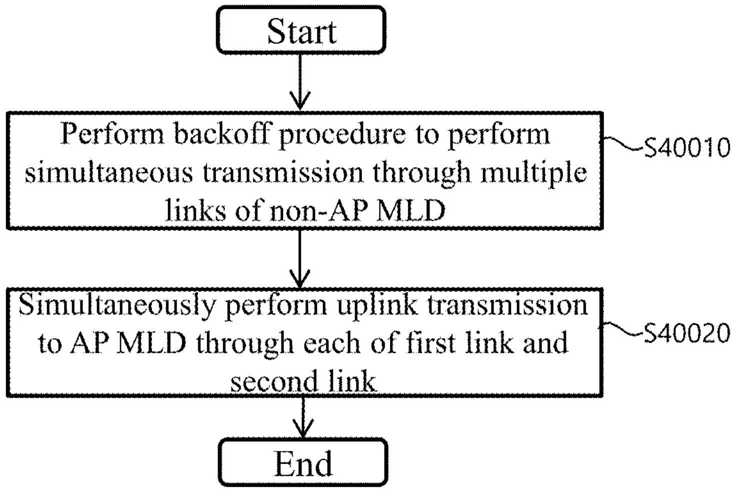
FIG. 40 illustrates an example of a method in which a multi-link device performs simultaneous transmission through multiple links according to an embodiment of the present invention.

FIG. 40 illustrates an example of a method in which a multi-link device performs simultaneous transmission through multiple links according to an embodiment of the present invention.

Referring to FIG. 40, a non-AP MLD may perform a backoff procedure to perform simultaneous transmission through multiple links (operation S40010). The backoff procedure may be individually performed through each of a first link of a first STA included in the non-AP MILD and a second link of a second STA included therein.

The backoff procedure in the first link is performed using a first backoff counter, and the backoff procedure in the second link is performed using a second backoff counter.

Thereafter, the non-AP MLD may simultaneously perform uplink transmission to an AP MLD through each of the first link and the second link (operation S40020).

In a case where the first backoff counter and the second backoff counter have both a value of "0", if the transmission time point of the uplink transmission in the first link is a slot boundary of a first slot that is a slot next to a slot in which the first backoff counter is "0", the uplink transmission in the second link may be performed within a predetermined time from the transmission time point of the first link.

Specifically, a slot configuration may vary for each link, and thus the boundaries of slots between links may not match each other. Therefore, the boundaries of slots between links may not match each other in relation to respective slots, the backoff counter of which decreases, and when all backoff counters of backoff procedures have reached "0" through a deferring operation described above in multiple links of the MLD, respectively, slot boundaries of respective links may not match each other. Slots of respective links may be individually configured, and thus slot boundaries of respective links may not match each other. Therefore, even when the values of backoff counters in respective links are all "0", slot boundaries may be different from each other. In this case, simultaneous transmission may be performed according to a slot boundary of a particular link among multiple links when the value of the backoff counter of the particular link is "0". That is, respective links do not perform uplink transmission according to slot boundaries of the links, and may defer or advance a transmission time point of uplink transmission according to a slot boundary of a particular link so as to simultaneously perform the uplink transmission.

For example, if multiple links of an MLD are configured by a first link and a second link, and one backoff counter among a first backoff counter of the first link and a second backoff counter of the second link has reached "0" earlier than the remaining backoff counter, the slot boundaries of the first link and the second link for uplink transmission may not match each other when the remaining backoff counter reaches "0". In this case, a transmission time point of uplink transmission in the second link may be adjusted by being advanced or delayed according to the slot boundary of the slot in which the first backoff counter of the first link is "0", or the slot boundary of a first slot which is next to the slot.

An uplink transmission time point in the first link and an uplink transmission time point in the second link may be within a particular time. For example, the uplink transmission time point in the second link may be positioned within 4 s from the uplink transmission time point in the first link.

Through the method described above, uplink transmission is performed at a different time point rather than the slot boundary of the slot in which the second backoff counter of the second link is "0" or the slot boundary of a second slot which is next to the slot, thereby uplink transmission may be simultaneously performed in the first link and the second link.

If the first backoff counter and the second backoff counter are both "0", a transmission time point of the uplink transmission in the second link may be adjusted to be included in the predetermined time from the slot boundary of the first slot.

If the first backoff counter is "0" and the second backoff counter is "0", the slot boundary of the first slot does not match the slot boundary of the second slot that is next to the slot in which the second backoff counter of the second link is "0", and the slot boundary of the second slot may not be included in the predetermined time.

In addition, if one backoff counter among the first backoff counter and the second backoff counter has reached "0" earlier than the remaining backoff counter, a link using the one backoff counter among the first link and the second link may not perform the uplink transmission, and maintain the one backoff counter at "0" until the remaining backoff counter reaches "0".

That is, as described above, even in a case where a channel access procedure is terminated in one link among multiple links of an MLD and thus the value of a backoff counter reaches "0", when a backoff counter value of another link has not reached "0", an STA of the MLD may not perform uplink transmission in the corresponding link and maintain the value of the backoff counter as 0. In other words, in a case where the value of a backoff counter reaches "0" in a particular link, when the value of a backoff counter in another link of an MLD has not reached "0", an STA of the MLD may select not performing uplink transmission and maintaining the value of the backoff counter as 0.

For example, multiple links of an MLD may be configured by a first link and a second link, a backoff procedure for channel access in the first link may be performed by a first backoff counter, and a backoff procedure for channel access in the second link may be performed by a second backoff counter. The backoff procedures may be individually performed through the first link and the second link included in the multiple links, respectively.

In this case, if one backoff counter among the first backoff counter and the second backoff counter has reached "0" earlier than the remaining backoff counter, a particular link using the one backoff counter among the first link and the second link may not perform the uplink transmission, and maintain the one backoff counter at the value of "0" until the remaining backoff counter reaches the value of "0". Alternatively, the one backoff counter may continuously maintain the value of "0" even after the remaining backoff counter has reached the value of "0".

In a non-AP MLD, in a case where one backoff counter among the first backoff counter and the second backoff counter has reached "0" earlier than a remaining backoff counter, if the slot boundary of the first slot of the first link does not match a slot boundary of a second slot that is next to a slot in which the second backoff counter of the second link is "0" when the remaining backoff counter reaches "0", a transmission time point of the uplink transmission in the second link is adjusted to be positioned before or after the slot boundary of the second slot so as to be included in the predetermined time from the slot boundary of the first slot.

In a case where the slot boundary of the second slot is positioned before or after the slot boundary of the first slot in a time axis, the transmission time point of the second link may be delayed or advanced from the slot boundary of the first slot by a particular time.

A maximum value of the predetermined time is 4 us, and 4 μs may be a change time required to perform the uplink transmission from a channel access procedure.

In addition, the non-AP MLD may perform channel sensing up to the transmission time point of the second link, and the transmission time point of the second link may not match the slot boundary of the second slot of the second link.

The uplink transmission may be performed in slots next to slots in which the first backoff counter and the second backoff counter have reached "0", and the first link and the second link may be an NSTR link pair that does not support simultaneous transmit or receive (STR).

In addition, the non-AP MLD may perform sensing to determine whether a channel is idle in each of the first link and the second link, and the first backoff counter and the second backoff counter may be decreased when the first link and the second link are in an idle state, respectively.

The above description of the present invention is used for exemplification, and those skilled in the art would understand that the present invention can be easily modified to other detailed forms without changing the technical idea or an essential feature thereof. Thus, it is to be appreciated that the embodiments described above are intended to be illustrative in every sense, and not restrictive. For example, each element described as a single type may be implemented to be distributed and similarly, elements described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A multi-link device (MLD) configured to operate in a wireless communication system, the MLD comprising:

a communication module; and a processor configured to control the communication module, wherein the processor is configured to:

perform a backoff procedure for channel access through each of a first link and a second link, wherein the MLD includes a first station (STA) operating on the first link and a second STA operating on the second link, and wherein the first STA chooses one of initiating transmission through the first link or maintaining a value of a first backoff counter at 0 without performing transmission when the first backoff counter of the first link and reaches 0 before a second backoff counter of the second link, and when the first STA maintains the value of the first backoff counter at "0" without performing transmission, initiate the transmission on each of the first link of the first STA and the second link of the second STA, wherein the first STA initiates the transmission at a second slot boundary through the first link when a first slot boundary of the first link of the first STA and the second slot boundary of the second link of the second STA are aligned in time, and wherein the first STA initiates the transmission through the first link within a specific time from the second slot boundary when the first slot boundary of the first link of the first STA and the second slot boundary of the second link of the second STA are not aligned in time and the transmission is not initiated at the first slot boundary.

2. The MLD of claim 1, wherein the first STA initiates the transmission based on the first backoff counter in the first link, and wherein the second STA initiates the transmission based on the second backoff counter in the second link.

3. The MLD of claim 1, wherein the first backoff counter of the first link and the second backoff counter of the second link are each independently decreased.

4. The MLD of claim 1, wherein the specific time is derived from an aRxTxTurnaroundTime parameter indicating a maximum time required to change from reception to transmission.

5. The MLD of claim 1, wherein the specific time is 4 μs.

6. The MLD of claim 1, wherein the first link and the second link are a Nonsimultaneous transmit and receive (NSTR) link pair of the MLD that does not support simultaneous transmit and receive (STR).

7. The MLD of claim 1, wherein the processor is configured to:

perform sensing to determine whether a channel for the channel access is idle in each of the first link and the second link, wherein each of the first backoff counter and the second backoff counter is decreased when each of the first link and the second link is determined to be in an idle state, respectively.

8. A method of performing uplink transmission by a multi-link device (MLD) configured to operate in a wireless communication system, the method comprising:

performing a backoff procedure for channel access through each of a first link and a second link, wherein the MLD includes a first station (STA) operating on the first link and a second STA operating on the second link, and wherein the first STA chooses one of initiating transmission through the first link or maintaining a value of a first backoff counter at 0 without performing transmission when the first backoff counter of the first link reaches 0 before the second backoff counter; and when the first STA maintains the value of the first backoff counter at 0 without performing transmission, initiating the transmission on each of the first link of the first STA and the second link of the second STA, wherein the first STA initiates the transmission at a second slot boundary through the first link when a first slot boundary of the first link of the first STA and the second slot boundary of the second link of the second STA are aligned in time, and wherein the first STA initiates the transmission through the first link within a specific time from the second slot boundary when the first slot boundary of the first link of the first STA and the second slot boundary of the second link of the second STA are not aligned in time and the transmission is not initiated at the first slot boundary.

9. The method of claim 8, wherein the first STA initiates the transmission based on the first backoff counter of the first link, and wherein the second STA initiates the transmission based on the second backoff counter of the second link.

10. The method of claim 8, wherein the first backoff counter of the first link and the second backoff counter of the second link are each independently decreased.

11. The method of claim 8, wherein the specific time is derived from an aRxTxTurnaroundTime parameter indicating a maximum time required to change from reception to transmission.

12. The method of claim 8, wherein the specific time is 4 μs.

13. The method of claim 8, wherein the first link and the second link are a Nonsimultaneous transmit and receive (NSTR) link pair of the MLD that does not support simultaneous transmit and receive (STR).

14. The method of claim 8, further comprising:

performing sensing to determine whether a channel for channel access is idle in each of the first link and the second link, wherein each of the first backoff counter and the second backoff counter is decreased when each of the first link and the second link is determined to be in an idle state, respectively.

* * * * *